United States Patent [19]
Inoue

[11] Patent Number: 5,808,991
[45] Date of Patent: Sep. 15, 1998

[54] OPTICAL INFORMATION RECORDING AND REPRODUCING APPARATUS AND METHOD WHICH ENABLE RECORDING AND VERIFYING AT THE SAME TIME

[75] Inventor: Masato Inoue, Kawasaki, Japan

[73] Assignee: Canon Kabushiki Kaisha, Tokyo, Japan

[21] Appl. No.: 610,862

[22] Filed: Mar. 5, 1996

[30] Foreign Application Priority Data

| Mar. 6, 1995 | [JP] | Japan | 7-045440 |
| Mar. 6, 1995 | [JP] | Japan | 7-057383 |
| Mar. 16, 1995 | [JP] | Japan | 7-057381 |
| Mar. 16, 1995 | [JP] | Japan | 7-057382 |

[51] Int. Cl.$^6$ ................................. G11B 7/00
[52] U.S. Cl. .................. 369/54; 369/44.38; 369/44.1
[58] Field of Search ............... 369/44.35, 44.29, 369/44.36, 44.27, 44.37, 44.41, 54, 44.38; 235/454

[56] References Cited

U.S. PATENT DOCUMENTS

| 5,105,413 | 4/1992 | Bakx ............................... 369/54 |
| 5,267,226 | 11/1993 | Matsuoka et al. ............... 369/44.37 |
| 5,475,665 | 12/1995 | Tani et al. ....................... 369/44.38 |

FOREIGN PATENT DOCUMENTS

| 0087174 | 8/1983 | European Pat. Off. . |
| 0284273 | 9/1988 | European Pat. Off. . |
| 0404247 | 12/1990 | European Pat. Off. . |
| 2175123 | 11/1986 | United Kingdom . |

OTHER PUBLICATIONS

Japanese Patent Abstract, Document No. JP404143927A, May 18, 1992.

Patent Abstracts of Japan for document No. 4–143926, vol. 16, No. 424 (P–1415), Sep. 1992.

Patent Abstracts of Japan for document No. 6–012722, vol. 18, No. 216 (P–1728), Apr. 1994.

*Primary Examiner*—Thang V. Tran
*Attorney, Agent, or Firm*—Fitzpatrick, Cella, Harper & Scinto

[57] ABSTRACT

An optical information recording and reproducing apparatus records information by running a recording light spot, which has been modulated in accordance with an information signal, on an information track of an information recording medium and applies a verifying light spot after the recording light spot to reproduce the recorded information by the verifying light spot so as to generate a verifying signal. The optical information recording and reproducing apparatus is equipped with a gain selector circuit for changing the gain of the verifying signal according to the modulation of the recording light spot. An output signal of the gain selector circuit is employed to verify the recorded information by the recording light spot.

12 Claims, 33 Drawing Sheets

$(I_0+I_1)W(t)$ $(I_0+I_1 P(t))$

Q $(I_0+I_1 P(t))W(t)$

Q

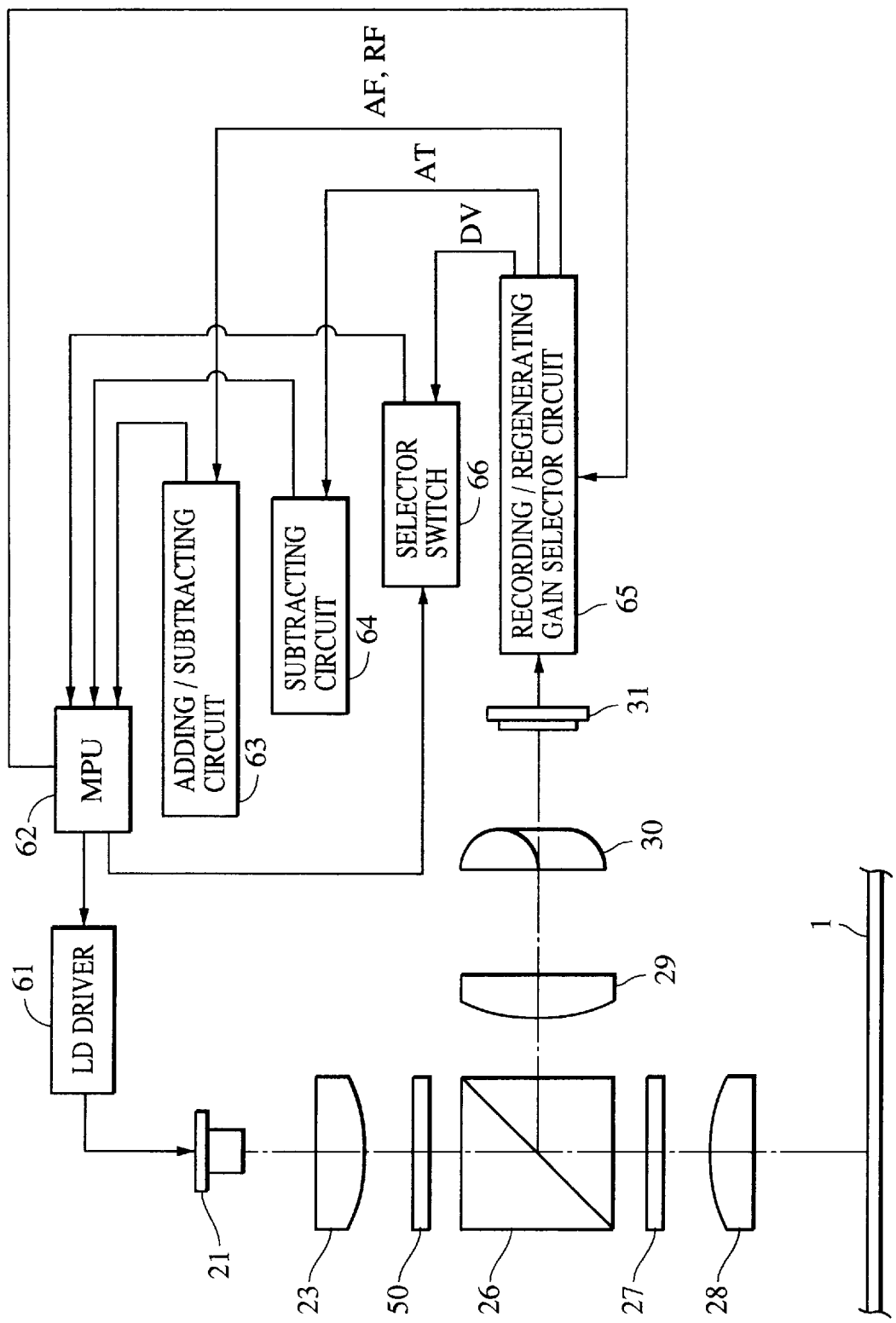

$(I_0+I_1)W(t)$ $1/W(t)$ $(I_0+I_1 P(t))W(t)$
Q $(I_0+I_1 P(t))$
Q $(I_0+I_1)W$ $(I_0+I_1P)/(I_0+I_1)$ $(I_0+I_1P)W$ $(I_0+I_1)W$ $I_1(P-1)$
$(\because W=1)$ $(I_0+I_1P)W$

OPTICAL INFORMATION RECORDING AND REPRODUCING APPARATUS AND METHOD WHICH ENABLE RECORDING AND VERIFYING AT THE SAME TIME

BACKGROUND OF THE INVENTION

1. Field of the Invention

The present invention relates to an optical information recording and reproducing apparatus and method for optically recording information on or reproducing it from an information recording medium and, more particularly, to direct verifying for recording information and reproducing the recorded information for verifying at the same time.

2. Description of the Related Art

Hitherto, various types of recording media including disks, cards, and tapes are known for optically recording information or reproducing recorded information. Some of the information recording media enable both recording and reproduction and some of them enable only reproduction. In the case of the recording media which permit recording, information is recorded by scanning an information track with a minute optical beam spot, which has been modulated in accordance with the information to be recorded, so that the information is recorded in the form of an optically detectable information pit string.

To reproduce information from the recording medium, the information pit string on the information track is scanned with a light spot of a certain power level, which is not high enough for recording, in order to detect reflected light or transmitted light from the recording medium. Based on the obtained detection signal, the recorded information is reproduced. An optical head used for recording information on or reproducing it from such a recording medium is designed to move relatively in the direction of the information track and across the track with respect to the recording medium. The light spot is allowed to access a desired information track by the relative movement in the two directions, thereby scanning the information track.

The optical head is provided with a stop-down lens for stopping down an optical beam; an object lens is employed for the stop-down lens. The objective lens is held so that it is allowed to move independently from the main body of the optical head in the direction of the optical axis, i.e. focusing direction, and in the direction which is orthogonal to the information tracks of the recording medium, i.e. in the tracking direction. Such an objective lens is generally held via an elastic component and driven by an actuator, which utilizes magnetic interaction, to move in the focusing direction and in the tracking direction of the objective lens.

FIG. 1 is a schematic top plan view of a write-once optical card. Many information tracks 2 are arranged in parallel in the direction of L-F on the information recording surface of an optical card 1. A home position 3, which provides the reference position of access to the information tracks 2, is provided on the information recording surface of the optical card 1. The information tracks 2 are numbered and arranged in sequence like 2-1, 2-2, 2-3 and so on, 2-1 being closest to the home position 3. Further, as shown in FIG. 2, tracking tracks numbered 4-1, 4-2, 4-3, and so on are disposed adjacent to these information tracks 2. These tracking tracks are used as the guides for the auto-tracking (hereinafter referred to as "AT") to perform control so that the light spot does not deviate from a predetermined information track during the scanning with the light spot at the time of recording or reproducing information.

The AT control detects the deviation of the light spot from an information track, namely, an AT error, in the optical head. The AT control is carried out by a servo control circuit which implements negative feedback of the detected information to a tracking actuator which drives the objective lens in the tracking direction. In other words, the objective lens is moved in the tracking direction, direction D, in relation to the optical head main body to prevent the light spot from deviating from a desired information track.

When scanning the information tracks with the light spot for recording or reproducing information, the objective lens is subjected to auto-focusing (hereinafter referred to as AF) control so as to control the light spot to an appropriate size for focusing on the optical card surface. The AF control is performed in the optical head as follows: the deviation from focus, namely, AF error, of the light spot is detected and the detected signal is negatively fed back to a focusing actuator which moves the objective lens in the direction of the optical axis, so that the light spot is focused on the optical card surface (recording layer) by moving the objective lens in the focusing direction with respect to the optical head main body.

In FIG. 2, S1, S2, S3, S4, and S5 denote the light spots irradiated on the information tracks of the optical card. The AT control is conducted by using the light spots S1 and S5 which are partially on the tracking tracks 4-2 and 4-3. Further, the light spot S3 is used to perform the AF control, create information pits for recording, and read the information pits for reproduction. The light spots S2 and S4 are used to verify the information pits immediately after recording. In the drawing, 5-1 and 5-2 denote the information pits which have been recorded using the light spot S3; the information pit 5-1 has been produced by moving the light spot in a direction L and the information pit 5-2 has been produced by moving the light spot in a direction F.

FIG. 3 shows the configuration of an optical information recording and reproducing apparatus which employs the optical card as the information recording medium. The apparatus shown in FIG. 3 includes: a semiconductor laser 21 serving as the light source which emits a laser beam of a wavelength of 830 nm which is polarized perpendicularly to the information tracks; a collimator lens 23; a diffraction grating 50 wherein lattices are arranged in two dimensions for splitting luminous fluxes; a polarized beam splitter 26; a quarter-wavelength plate 27; an objective lens 28; a spherical lens 29; a cylindrical lens 30; and an optical detector 31. As shown in FIG. 4, the optical detector 31 is constituted by four light receiving elements 31a, 31b, 31d, and 31e and a single quadrant light receiving element 31c which is divided into four segments. All the optical elements listed above are integrated to form the optical head and they are configured to enable access to a desired information track of the optical card 1. Reference numeral 61 denotes a laser driver (hereinafter referred to as "LD driver") and 62 denotes an MPU.

To record information on the optical card 1 by the optical head, a current of a recording level is applied by the LD driver 61 to the semiconductor laser 21 in accordance with a recording instruction issued from the MPU 62. To reproduce information, a current of a reproducing level is applied by the LD driver 61 to the semiconductor laser 21 in accordance with a reproducing instruction issued from the MPU 62. The semiconductor 21 is thus driven and the light beam emitted from the semiconductor laser 21 turns into a diverging luminous flux which goes into the collimator lens 23. The luminous flux is collimated through the collimator lens 23 before it reaches the two-dimensional diffraction grating 50 which divides it into five effective light beams, namely zero-dimensional diffracted light and ± one-dimensional diffracted light in two directions.

The five divided luminous fluxes reach and pass through the polarized beam splitter 26 as P-polarized luminous fluxes and go through the quarter-wavelength plate 27; they are converted to a circularly polarized light as they pass through the quarter-wavelength plate 27. The five luminous fluxes which have been converted to the circularly polarized beams are stopped down to minute light spots through the objective lens 28 and converged onto the optical card 1. The converged beams are the minute light spots S1 and S2 (+1 one-dimensional diffracted beams), S3 (zero-dimensional diffracted beam), and S4 and S5 (−1 one-dimensional diffracted beams) as shown in FIG. 2. The light spot S3 is used for recording, reproducing, and AF control as described above; S1 and S5 are used for the AT control; and S2 and S4 are used for verifying.

FIG. 2 shows the positions of the light spots on the optical card 1: the light spots S1 and S5 are located on the adjacent tracking tracks; and the light spots S2, S3, and S4 are located on the information track 2 between the tracking tracks. The light spots S2 and S4 for verifying are located before and after the light spot S3 in the running direction. Thus, the light spots are irradiated onto the optical card 1 and some of them reflect on the card surface into the objective lens 28. The reflected light goes through the objective lens 28 to become parallel luminous fluxes which pass through the quarter-wavelength plate 27 whereby they are converted to light beams which have been rotated 90 degrees in the polarization from those before they entered the quarter-wavelength plate 27. The luminous fluxes then go into the polarized beam splitter 26 as S-polarized beams and they are reflected toward a detecting optical system due to the characteristics thereof, thereby being separated from the incident luminous fluxes coming from the semiconductor laser 21.

The detecting optical system is constructed by the spherical lens 29, the cylindrical lens 30, and the optical detector 31. The combination of the spherical lens 29 and the cylindrical lens 30 enables the detection of the AF control signal by the astigmatism method. The five luminous fluxes reflected from the optical card 1 are detected by the optical detector 31 constituted by a plurality of light receiving elements and the light receiving signals detected by the light receiving elements are sent to an add/subtracting circuit 63, a subtracting circuit 64, and a selector switch 66. The adding/subtracting circuit 63 generates an AF control signal, i.e. a focusing error signal, and an information reproducing signal and sends them to the MPU 62 as it will be discussed in more detail later. The subtracting circuit 64 generates an AT control signal, i.e a tracking error signal, and sends it to the MPU 62 as it will be discussed later. The selector switch 66 selects a signal for verifying according to a moving direction signal, i.e. a signal, which indicates the scanning direction of the light spots and which is issued from the MPU 62, and sends the selected signal back to the MPU 62.

The MPU 62 drives a focusing actuator and a tracking actuator, which are not shown, in accordance with the AF control signal and the AT control signal so as to perform the focusing control and the tracking control by moving the objective lens 28 in the focusing direction and tracking direction. When reproducing the information, MPU 62 carries out predetermined signal processing on the information reproducing signal to produce reproduced data. When recording information, the MPU 62 compares the verifying signal, which has been selected by the selector switch 66, with the recording signal so as to perform verifying while recording at the same time, that is, direct verifying.

FIG. 4 is a circuit diagram illustrative of a signal processing circuit of the aforesaid optical information recording and reproducing apparatus. The signal processing circuit shown in FIG. 4 includes the optical detector 31 which is shown in FIG. 3 and which is comprised of the light receiving elements 31a, 31b, 31d, 31e, and the quadrant light receiving element 31c. The light spots on the light receiving surfaces of the respective light receiving elements indicate the reflected light of the light spots shown in FIG. 2. The reflected light of the light spots S1 and S5 for the AT control is respectively received by the light receiving elements 31a and 31e; the reflected light of the light spot S3 for the AF control, recording, and reproduction is received by the quadrant light receiving element 31c. The reflected light of the light spots S2 and S4 for verifying is respectively received by the light receiving elements 31b and 31d.

The output signals of the light receiving element segments which are positioned diagonally to each other in the quadrant light receiving element 31c are respectively added by the adding circuits 117 and 118. The output signals of the adding circuits 117 and 118 are subtracted by the subtracting circuit 120 to generate the AF control signal. Or the output signals of the adding circuits 117 and 118 are added by the adding circuit 121 to generate the information reproducing signal. The information reproducing signal is the total signal of the quadrant light receiving element 31c. The aforesaid adding circuits 117 and 118, the adding circuit 120, and the adding circuit 121 construct the adding/subtracting circuit 63 shown in FIG. 3.

The output signals of the light receiving elements 31a and 31e are applied to the subtracting circuit 64 and the difference is detected by the subtracting circuit 64, thereby generating the AT control signal. The output signals of the light receiving elements 31b and 31d are supplied to the selector switch 66 which selects and issues one of the direct verifying (DV) signals in accordance with the moving direction signal received from the MPU 62. To be more specific, as shown in FIG. 2, if the scanning direction of the light spots is the direction F, then the selector switch 66 is connected to the F side, so that the output signal of the light receiving element 31d is output as the verifying signal to the MPU 62. If the scanning direction of the light spots is the direction L, then the selector switch 66 is connected to the L side, so that the output signal of the light receiving element 31b is sent as the verifying signal to the MPU 62. This means that the verifying light spots S2 and S4 are irradiated onto both sides of the recording light spot S3; therefore, when the scanning direction of the light spots on the way is switched for the way back on the optical card 1, the verifying signal, which has been reproduced using the light spots running after the recording light spot S3, is accordingly selected and issued.

The conventional optical information recording and reproducing apparatus stated above, however, is designed to divide the light beam of the semiconductor laser into a plurality of light beams to perform the recording and reproduction of information, the AF control, the AT control, and the verifying. Hence, at the time of recording information, the recording light spots are modulated according to the information and the modulation inevitably affects the other light spots including the verifying light spots. Furthermore, a transparent protective layer is provided on the recording layer of the optical card and there is a finite distance between the surface of the optical card and the surface of the recording layer, thus defocusing the light spots on the surface of the optical card.

Hence, the recording layer surface and the light receiving element surface of the optical detector are generally disposed to have a conjugate relationship; therefore, the reflected light from the surface of the optical card reaches the light receiving element surface of the optical detector in a defocused state. Accordingly, the defocused state of the reflected light from the optical card surface causes the light spots to diffuse on the light receiving surface of the optical detector; the defocused recording light spots leak out into the verifying light receiving elements 31b and 31d.

The problem will now be described in detail with reference to FIGS. 5(a) through 5(e) FIG. 5(a) shows the waveform of the output signal of the verifying light receiving element 31b or 31d which is observed when the recording light spot is run on the assumption that there are no information pits on the information tracks. Reference character $I_0$ denotes the signal level of the reflected light on the optical card surface of the recording light spot S3; $I_1$ denotes the signal level of the verifying light spot. Reference character W denotes the demodulation degree of the recording light spot and it is represented as a function W(t) of time. The verifying light receiving elements receive the reflected light of the verifying light spots and the reflected light of the recording light spot as stated above; therefore, the output signal of the verifying light receiving element will be $(I_0+I_1)W(t)$ as shown in FIG. 5(a).

FIG. 5(b) is illustrative of the output signal of the verifying light receiving element 31b or 31d which is observed when scanning with the recording light spot having a fixed intensity is performed and the modulation by information pits on the information tracks is implemented. At this time, intensity $I_0$ of the recording light spot reflected from the optical card surface is fixed as previously mentioned. Reference character P denotes the degree of modulation based on an information pit and it is represented by a time function P(t). In this case, the verifying light receiving element receives a component $I_1P(t)$ of a verifying light spot which has been subjected to intensity $I_0$ of the reflected light of the recording light spot and the modulation from the information pits; thus, the output signal of the verifying light receiving element will be $I_0+I_1 P(t)$ as illustrated in FIG. 5(b). FIG. 5(c) shows the binary signal which has been obtained by converting the signal shown in FIG. 5(b) into a binary signal at slicing level Q; this means that it is the binary signal of the information pit. In this case, the verifying light receiving element does not receive the component attributable to the power modulation; it receives only the modulation component attributable to the information pit. As a result, the binary signal corresponding to the information pit is obtained as shown in FIG. 5(c).

In actual use, however, the verifying light receiving element unavoidably receives the power modulation component and the information pit modulation component at the same time, undesirably affecting the verifying signal. FIG. 5(d) shows the output signal of the verifying light receiving element which has been subjected to the power modulation and the pit modulation at the same time. In this case, the output of the verifying light receiving element will be $(I_0+I_1 \cdot P(t))W(t)$. Accordingly, converting the output signal into a binary signal at slicing level Q gives the binary signal having the signal waveform illustrated in FIG. 5(e) which is different from the one of the binary signal shown in FIG. 5(c). Thus, the power modulation component entering the verifying light receiving element prevents accurate reproduction of a recording signal, adversely affecting the direct verifying.

SUMMARY OF THE INVENTION

The present invention has been accomplished with a view toward solving the problem described above and it is an object of the present invention to provide an optical information recording and reproducing apparatus and method which makes it possible to eliminate a power modulation component from a verifying signal by changing the gain of the verifying signal according to the modulation of recorded information, thus ensuring stable direct verifying.

To this end, according to one aspect of the present invention, there is provided an optical information recording and reproducing apparatus which records information by scanning with a recording light spot, which has been modulated in accordance with an information signal, on an information track of an information recording medium and which applies a verifying light spot after the recording light spot to reproduce the recorded information by the verifying light spot so as to generate a verifying signal, comprising:

a gain selector circuit for changing the gain of the verifying signal according to the modulation of the recording light spot, wherein an output signal of the gain selector circuit is employed to verify the information which has been recorded by the recording light spot.

According to another aspect of the present invention, there is provided an optical information recording and reproducing method wherein information is recorded by scanning with a recording light spot, which has been modulated in accordance with an information signal, on an information track of an information recording medium and a verifying light spot is applied after the recording light spot to reproduce the recorded information by the verifying light spot so as to generate a verifying signal, comprising:

a step for changing the gain of the verifying signal according to the modulation of the recording light spot; and a step for verifying the information, which has been recorded by the recording light spot, by using an output signal of the gain selector circuit.

The details will be given in the description of the embodiments to be discussed later.

BRIEF DESCRIPTION OF THE DRAWINGS

FIG. 6 is a diagram showing the configuration illustrative of a first embodiment of the optical information recording and reproducing apparatus in accordance with the present invention;

DESCRIPTION OF THE PREFERRED EMBODIMENTS

First Embodiment

Figure 3:
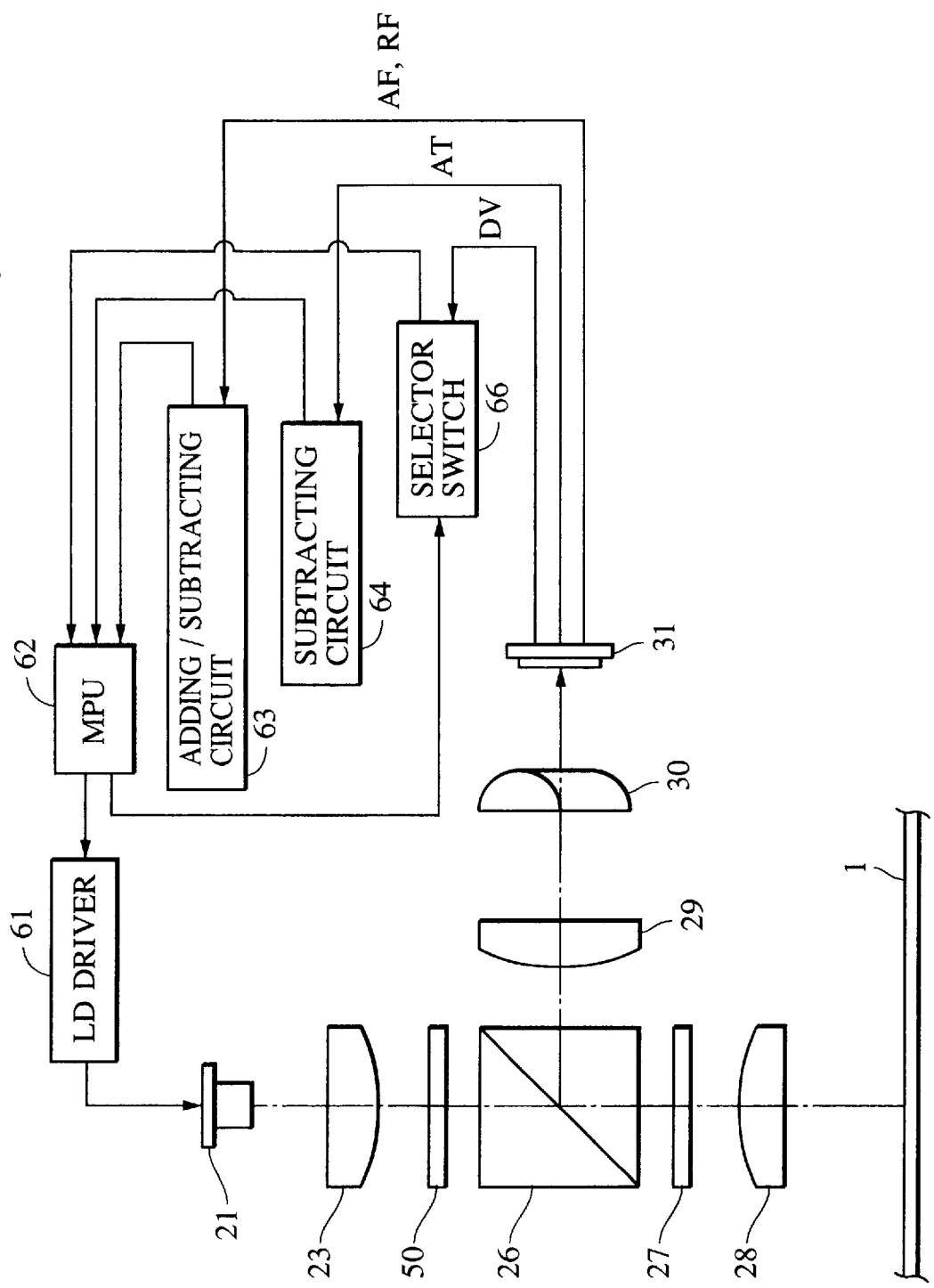
FIG. 3 is a diagram showing the configuration of a typical conventional optical card information recording and reproducing apparatus.

The first embodiment of the present invention will now be described with reference to the accompanying drawings. FIG. 6 is the diagram showing the configuration of the first embodiment of the optical information recording and reproducing apparatus in accordance with the present invention. In FIG. 6, the same components as those of the conventional apparatus shown in FIG. 3 are assigned the same reference numerals. In FIG. 6, the semiconductor laser 21, collimator lens 23, the diffraction grating 50, the polarized beam splitter 26, the quarter-wavelength plate 27, the objective lens 28, the spherical lens 29, the cylindrical lens 30, and the optical detector 31 are all the same as those of FIG. 3. These optical elements are integrated to form an optical head which irradiates a plurality of optical beams onto the optical card 1 which is an information recording medium. The optical card 1 is rested on a carriage which is not shown; the carriage is shuttled in the direction of information tracks by a mechanism which is not shown. This makes the optical head and the optical card 1 relatively shuttle in the direction of the information tracks and the optical beams emitted from the optical head run back and forth on the information tracks, thereby recording information on the information tracks or reproducing recorded information.

The LD driver 61, the MPU 62, the adding/subtracting circuit 63, the subtracting circuit 64, and the selector switch 66 are all the same as those of FIG. 3. Further in this embodiment, the output of the optical detector 31 is provided with a recording/reproducing gain selector circuit 65. The recording/reproducing gain selector circuit 65 is a gain selector circuit which changes the gain for amplifying the respective signals of the light receiving elements 31*a* through 31*e* of the optical detector 31 in accordance with the power modulation of the semiconductor laser 21 according to the recorded information at the time of information recording. By changing the gain, the signals of the respective light receiving elements of the optical detector 31 are maintained at fixed levels without being affected by the power modulation and they are sent to the circuits in the subsequent stage, which will be discussed in detail later. The MPU 62 is a microprocessor for controlling the respective sections in the apparatus; the LD driver 61 drives the semiconductor laser 21 under the control of the MPU 62. More specifically, the LD driver 61 drives the semiconductor laser 21 so that the optical output thereof provides reproducing power when reproducing information; it power-modulates the optical output of the semiconductor laser 21 in accordance with information signals when recording information. The adding/subtracting circuit 63 generates the AF control signal according to the light receiving signal of the optical detector 31 as previously mentioned and the subtracting circuit 64 generates the AT control signal according to the light receiving signal. The AF control signal is detected by the astigmatism method; the AT control signal is detected by a three-beam method. The AF control signal and the AT control signal are sent to the MPU 62 and the MPU 62 performs the focusing control and the tracking control in accordance with the control signals.

Figure 1:
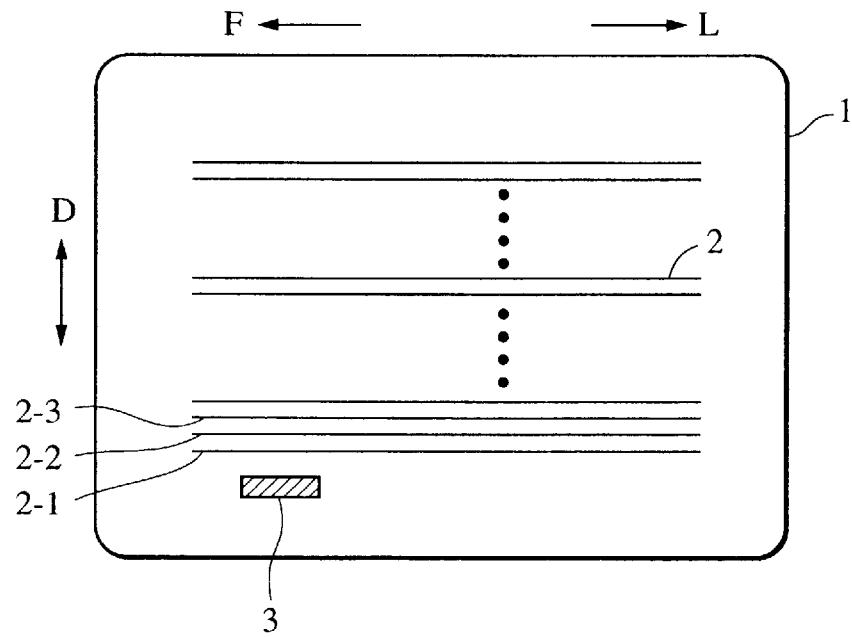
FIG. 1 is a diagram showing the recording surface of an optical card.
Figure 2:
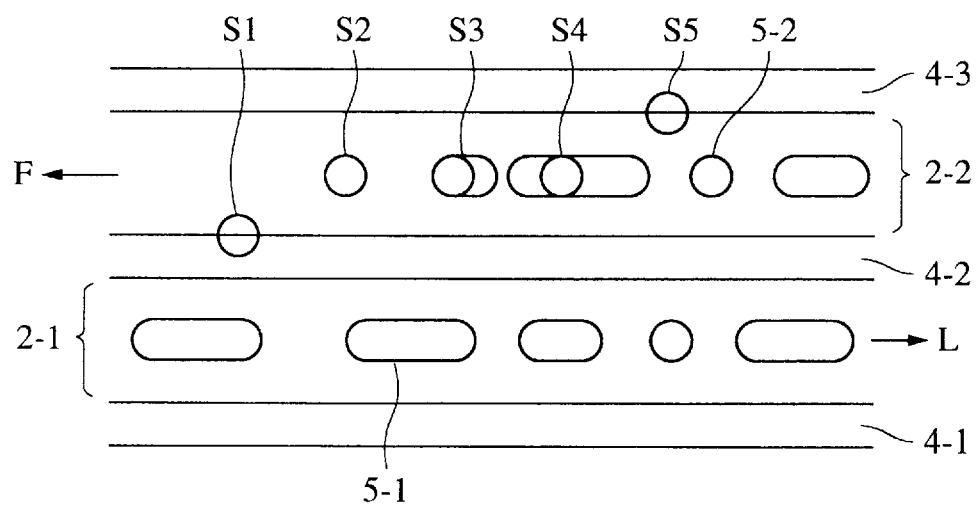
FIG. 2 is a diagram showing light spots irradiated onto the information tracks of the optical card.

The following describes the process for reproducing information: the adding/subtracting circuit 63 creates the light receiving signal of the optical detector 31, i.e. the total signal of the quadrant light receiving element 31c, to generate an information reproducing signal. The MPU 62 uses the obtained information reproducing signal to carry out predetermined signal processing so as to generate reproducing data. The selector switch 66 is a switch for selecting either the light receiving element 31b or 31d of the optical detector 31 according to the scanning direction of the light spots as stated above. This is necessary because the verifying light spots S2 and S4 are irradiated on both sides of the recording light spot S3 as illustrated in FIG. 2 and the verifying light spot running after the recording optical spot S3 switches between S2 and S4 according to the scanning direction of the light spots; therefore, the verifying signal is switched according to the scanning direction of the light spots. The MPU 62 compares the selected verifying signal with the recording signal to perform verifying while recording at the same time. The moving direction signal which indicates the scanning direction of the light spots is sent from the MPU 62 to the selector switch 66.

Figure 4:
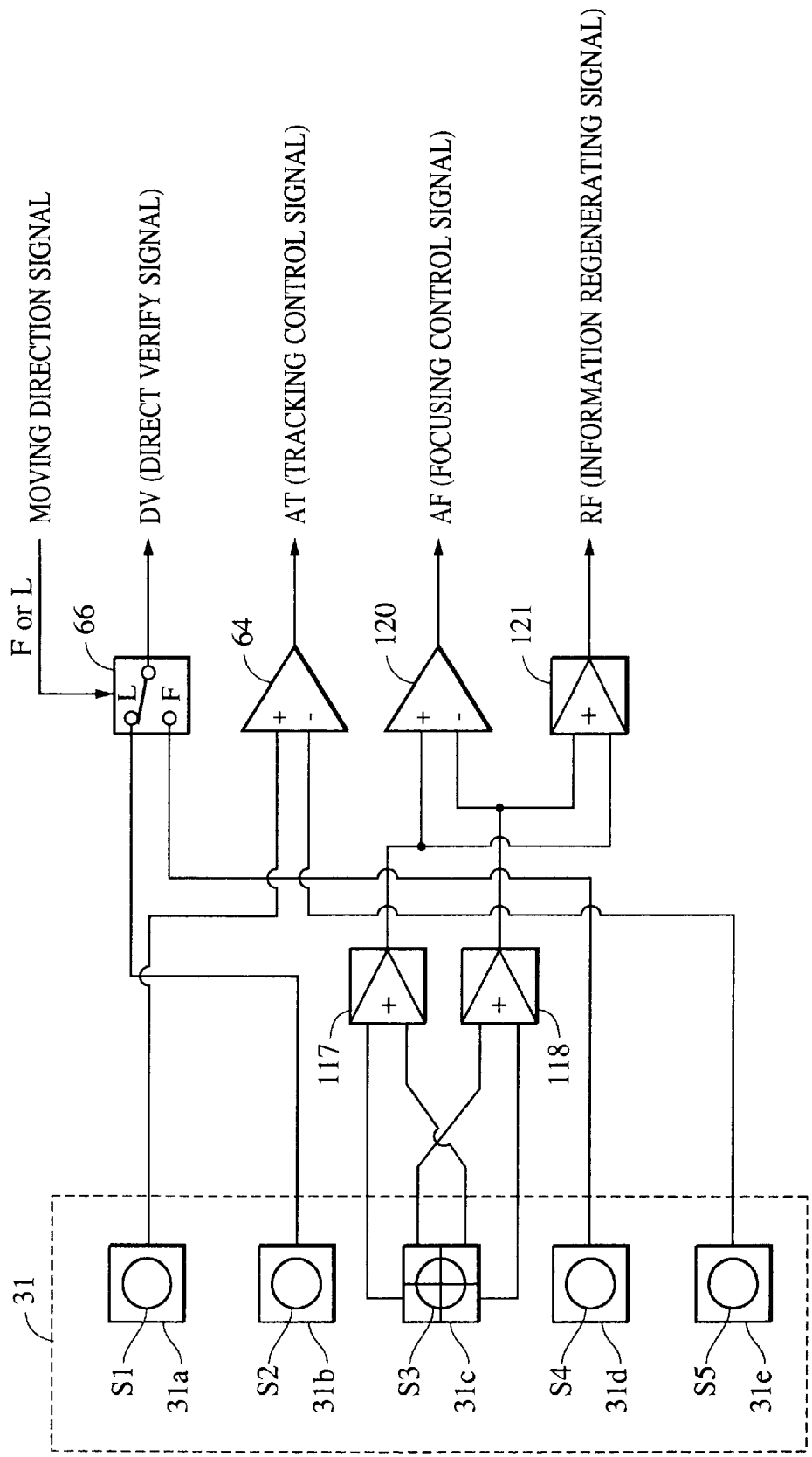
FIG. 4 is a circuit diagram illustrative of a signal processing circuit of the apparatus of FIG. 3.
Figure 5A:
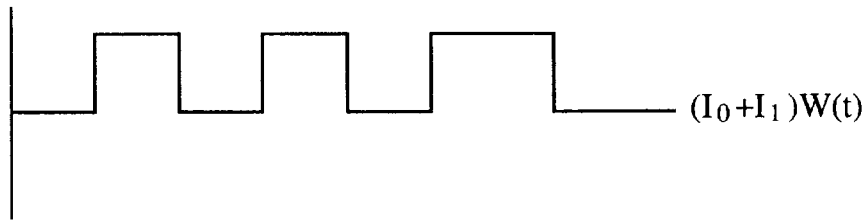
FIGS. 5(a) through 5(e) are diagrams showing a signal waveform for illustrating the operation for generating a verifying signal of the apparatus of FIG. 3.
Figure 5B:
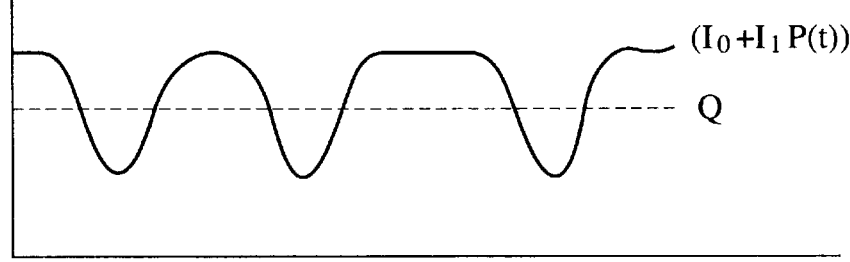
Figure 5C:
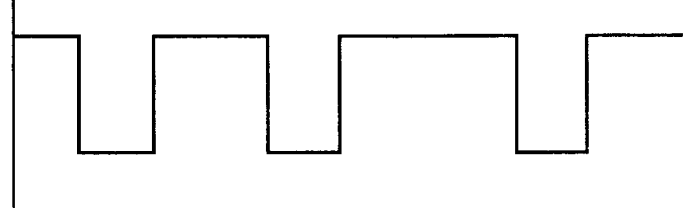
Figure 5D:
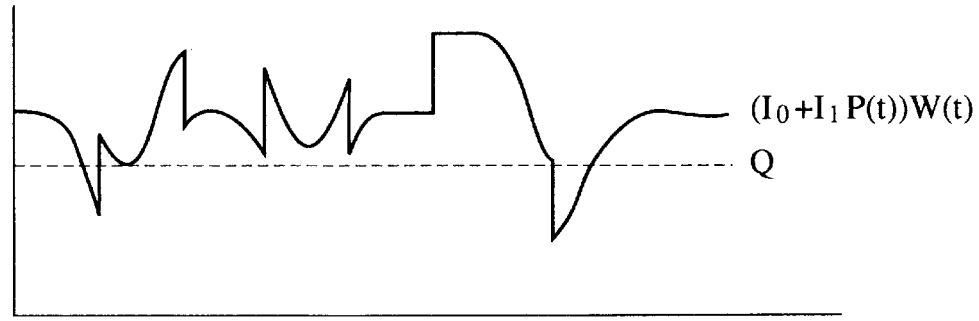
Figure 5E:
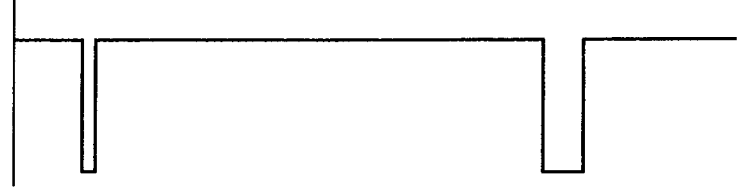
Figure 7:
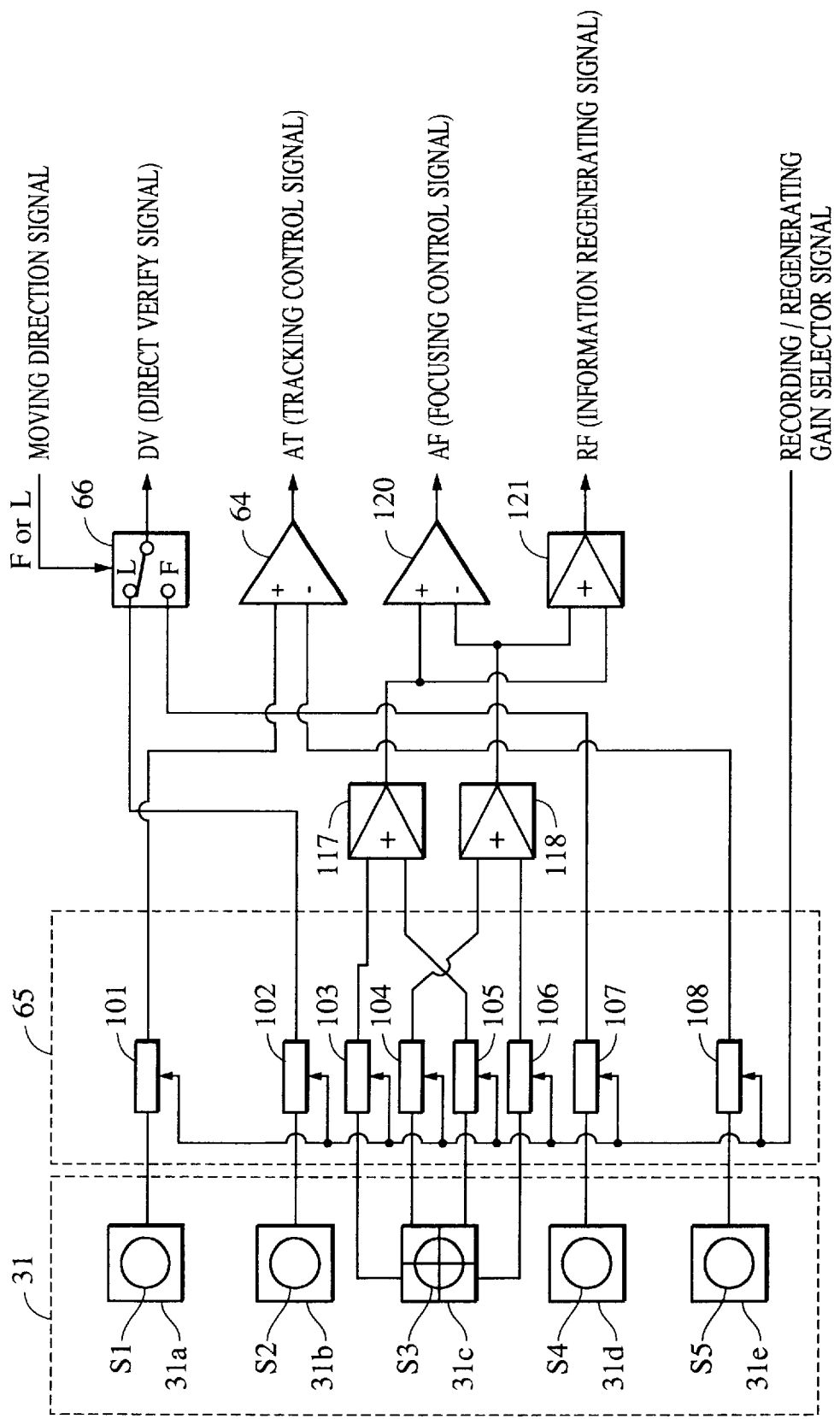
FIG. 7 is a circuit diagram illustrative of the details of the signal processing circuit of the embodiment shown in FIG. 6.

FIG. 7 is the circuit diagram showing the signal processing circuit of the above embodiment. In FIG. 7 also, the same components as those of the conventional signal processing circuit shown in FIG. 4 are given the same reference numerals. In FIG. 7, the reference numerals 31a through 31e denote the light receiving elements constructing the optical detector 31. In this embodiment also, the optical beam of the semiconductor laser 21 is divided into five optical beams; the optical beams are irradiated as the light spots S1 through S5 onto the optical card 1 as shown in FIG. 7. The reflected light of the light spots S1 and S5 for the AT control are respectively received by the light receiving elements 31a and 31e; the reflected light of the light spots S2 and S4 for verifying are received by the light receiving elements 31b and 31d. The reflected light of the light spot S3 for the AF control, recording, and reproduction is received by the quadrant light receiving element 31c.

As illustrated in FIG. 6, the recording/reproducing gain selector circuit 65 is a circuit for removing the influences of the power modulation of the semiconductor laser 21 when recording information; it is constructed by eight gain selector circuits 101 through 108. The output of the light receiving element 31a is provided with the gain selector circuit 101; the output of the light receiving element 31b is provided with the gain selector circuit 102; and the four light receiving element segments of the quadrant light receiving element 31c are respectively provided with the gain selector circuits 103 through 106. Likewise, the output of the light receiving element 31d is provided with the gain selector circuit 107 and the output of the light receiving element 31e is provided with the gain selector circuit 108. These gain selector circuits 101 through 108 function to change the gain for amplifying the signals according to the output power of the semiconductor laser 21 as previously mentioned. The signals of the light receiving elements 31a through 31e are turned into the signals, from which the power modulation components of the semiconductor laser 21 have been removed, by the gain changing operation performed by the respective gain selector circuits.

The output signals of the gain selector circuits 101 and 108 are supplied to the subtracting circuit 64 and the differences among them are detected through the subtracting circuit 64 to generate the AT control signal. The gain selector circuits 103 through 106 remove the power modulation components from the signals of the four light receiving element segments of the quadrant light receiving element 31c. The output signals of the gain selector circuits 103 and 105 for the light receiving element segments, which are positioned diagonally to each other, of the light receiving element 31c and the output signals of the gain selector circuits 104 and 106 are respectively added by the adding circuits 117 and 118. The difference between the output signals of the adding circuits 117 and 118 are detected by the subtracting circuit 120 and the difference is issued as the AF control signal. The output signals of the adding circuits 117 and 118 are added by the adding circuit 121 to generate a total signal of the output signals of the quadrant light receiving element 31c. The total signal is issued as the information reproducing signal. The adding circuits 117 and 118, the subtracting circuit 120, and the adding circuit 121 correspond to the adding/subtracting circuit 63 shown in FIG. 6. The output signals of the gain selector circuits 102 and 107 are supplied to the selector switch 66. The selector switch 66 selects one of the direct verifying (DV) signals according to the moving direction signal as stated above and supplies it to the MPU 62. The MPU 62 compares the selected verifying signal with the recording signal to perform verifying while recording at the same time as described above.

Figure 8A:
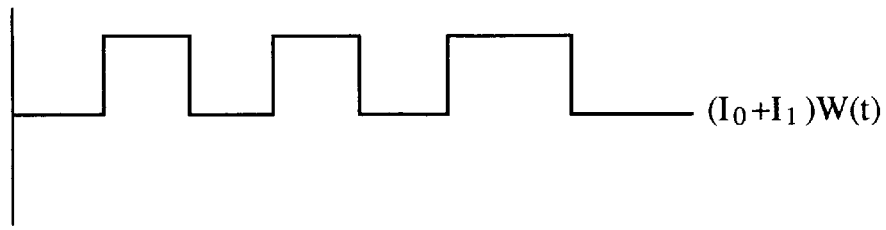
FIGS. 8(a) through 8(e) are signal waveform diagrams for illustrating the operation of the embodiment shown in FIG. 6.

With reference to FIGS. 8(a) through 8(e), the description will now be given to the gain changing operation by the recording/reproducing gain selector circuit 65 and the operation for generating the verifying signal at the time of recording of information. FIG. 8(a) shows the output signal of the verifying light receiving element 31b or 31d when a power-modulated light spot is run on the information tracks on the assumption that there is no information pit on the information tracks. Reference character $I_0$ denotes the signal level of the recording light spot in the reflected light on the surface of the optical card; reference character $I_1$ denotes the signal level of the verifying light spot. When recording information, the power modulation component, namely, $(I_0+I_1)W(t)$, enters the verifying light receiving element. Reference character W(t) denotes the degree of modulation used when modulating the recording light spot to the reproducing power and the recording power.

Figure 8B:
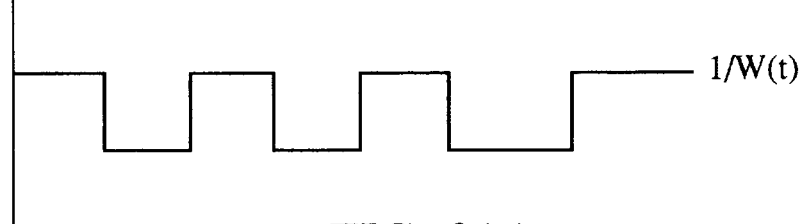
Figure 8C:
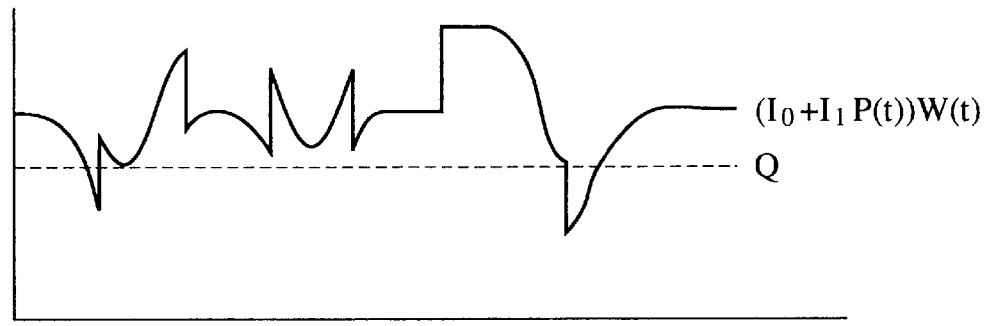

FIG. 8(b) shows gain K(t) of the respective gain selector circuits 101 through 108 of the recording/reproducing gain selector circuit 65. Gain K(t) is set so that K(t)=1/W(t) in relation to the degree of power modulation W(t) at the time of information recording. FIG. 8(c) shows the output signal of the verifying light receiving element at the time of information recording. Normally, at the time of information recording, the power modulation component and the information pit modulation component are received at the same time, resulting in the signal illustrated in FIG. 8(c). The output signals of the respective light receiving elements 31a through 31e of the optical detector 31 are applied to the respective corresponding gain selector circuits 101 through 108 of the recording/reproducing gain selector circuit 65 so as to change the gain to K(t)=1/W(t). Specifically, in the respective gain selector circuits 101 through 108 of the recording/reproducing gain selector circuit 65, the gain for amplifying the signals is changed according to the power of the recording light spot in accordance with the recording/reproducing gain selector signal received from the MPU 62. This changing operation offsets the power modulation components of the output signals of the respective light receiving elements 31a through 31c of the optical detector 31, thus converting the signals into ones with the power modulation components removed.

Figure 8D:
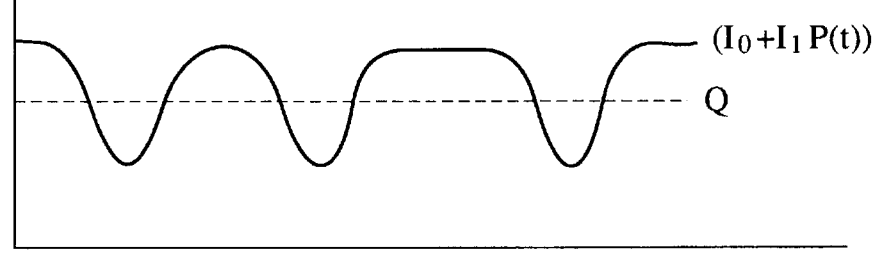
Figure 8E:
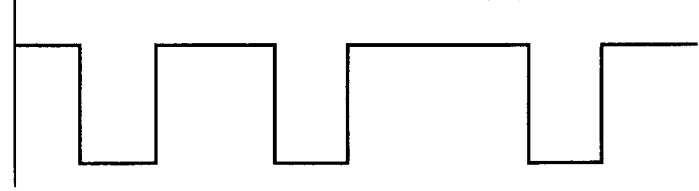

FIG. 8(d) shows the verifying signal obtained after changing the gain as stated above, i.e. the output signal of the gain selector circuit 102 or 107. The signal waveform proves that the power modulation component has been removed by changing the gain. Hence, converting the output signal of FIG. 8(d) into a binary signal at slicing level Q gives the binary signal as shown in FIG. 8(e); the binary signal is the verifying signal which has accurately reproduced the recording signal. The verifying signal of FIG. 8(d) will now be described. The verifying signal reflects the degree of power modulation W(t), the degree of modulation by information pit P(t), and gain K(t); verifying signal V(t) can be expressed by:

$$\begin{aligned} V(t) &= (I_0 + I_1 \cdot P(t)) \cdot W(t) \cdot K(t) \\ &= (I_0 + I_1 \cdot P(t)) \cdot W(t) \cdot (1/W(t)) \\ &= I_0 + I_1 \cdot P(t) \end{aligned}$$

Hence, as it is obvious from the above expression, the verifying signal contains only the modulation component from the information pit and it is free of the power modulation component. Signal level $I_0$ of the reflected light on the surface of the optical card is added as an offset of a fixed amount.

Figure 9:
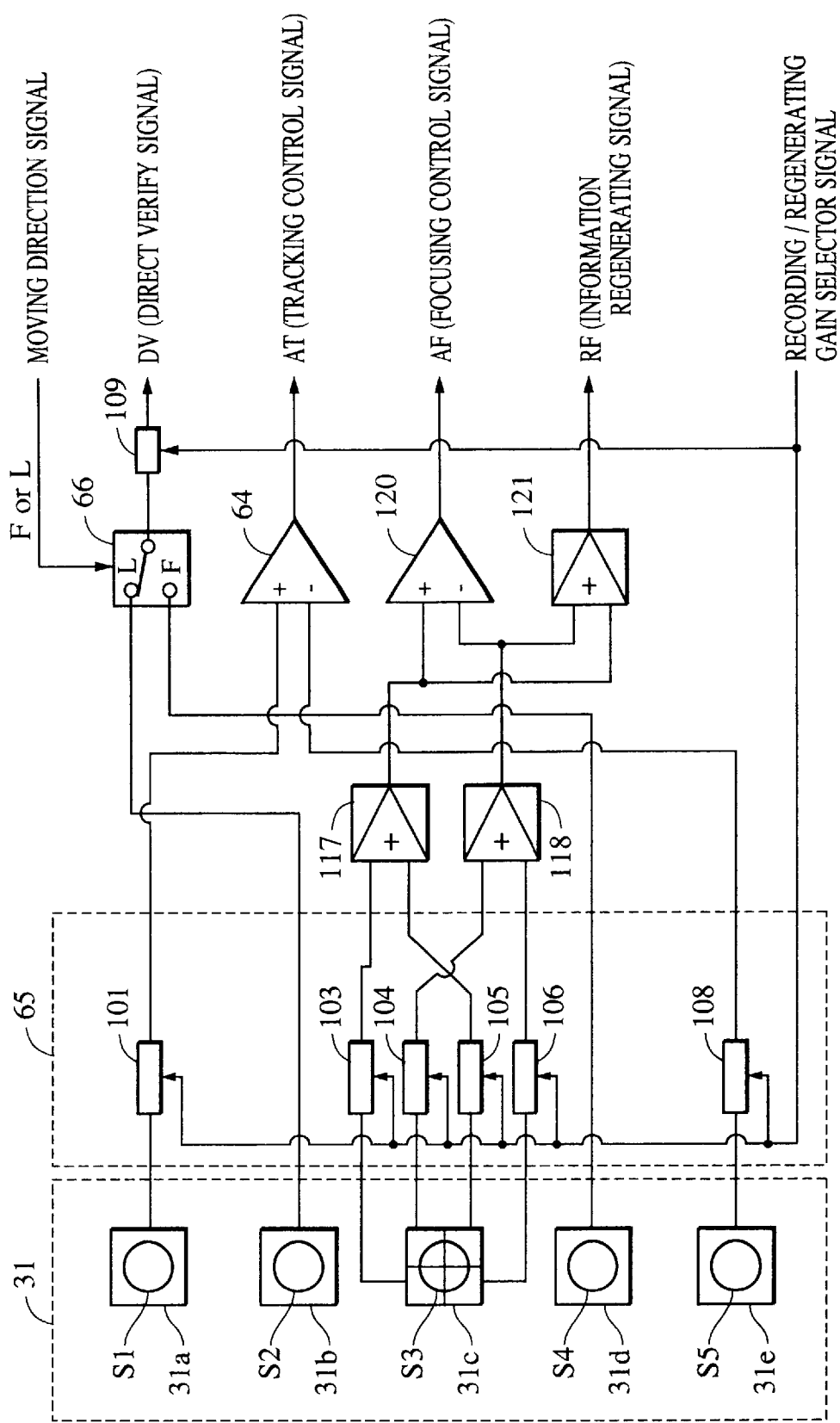
FIG. 9 is a circuit diagram showing another mode of the first embodiment in accordance with the present invention.

FIG. 9 is the circuit diagram illustrative of another mode of the first embodiment. In the embodiment shown in FIG. 6, the outputs of the verifying light receiving elements 31b and 31d are provided with the gain selector circuits 102 and 107, whereas in this mode of embodiment, the output of the selector switch 66 is provided with a gain selector circuit 109. Therefore, this mode of embodiment has only one gain selector circuit for the verifying light receiving element, permitting a simpler configuration.

The embodiments described above refer to the examples of the apparatus employing the optical card; however, the present invention is not limited thereto and it can be applied also to an optical disk apparatus, a magneto-optical disk apparatus, or other apparatus employing a disk recording medium. In the case of the apparatus employing a disk recording medium, however, the direction of rotation is usually fixed and the scanning direction of light spots is accordingly fixed. Therefore, only one verifying light spot needs to be applied after the recording light spot; accordingly, only one light receiving element is required for detecting the reflected light thereof.

Second Embodiment

Figure 10:
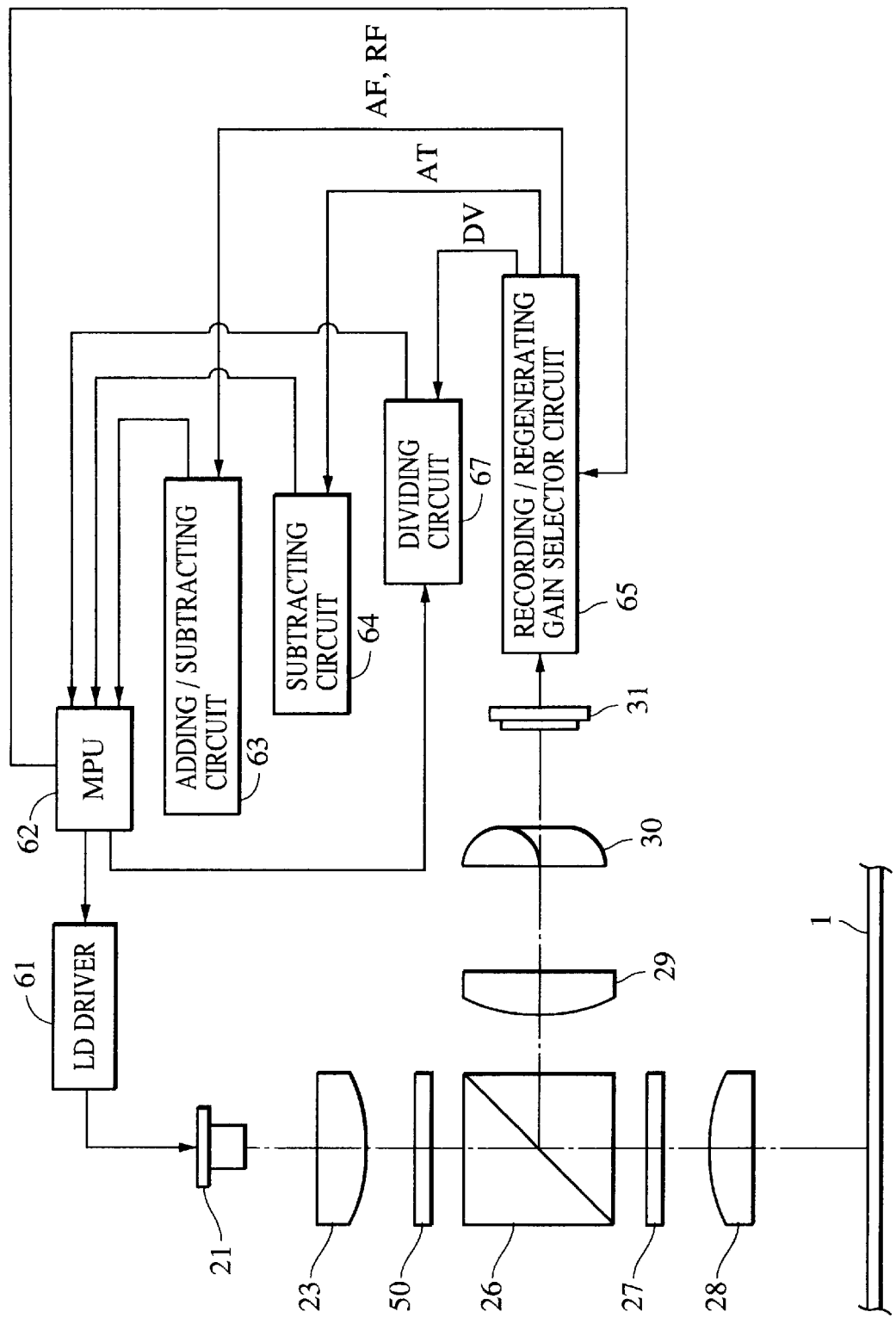
FIG. 10 is a diagram showing the configuration of a second embodiment of the optical information recording and reproducing apparatus in accordance with the present invention.
Figure 11:
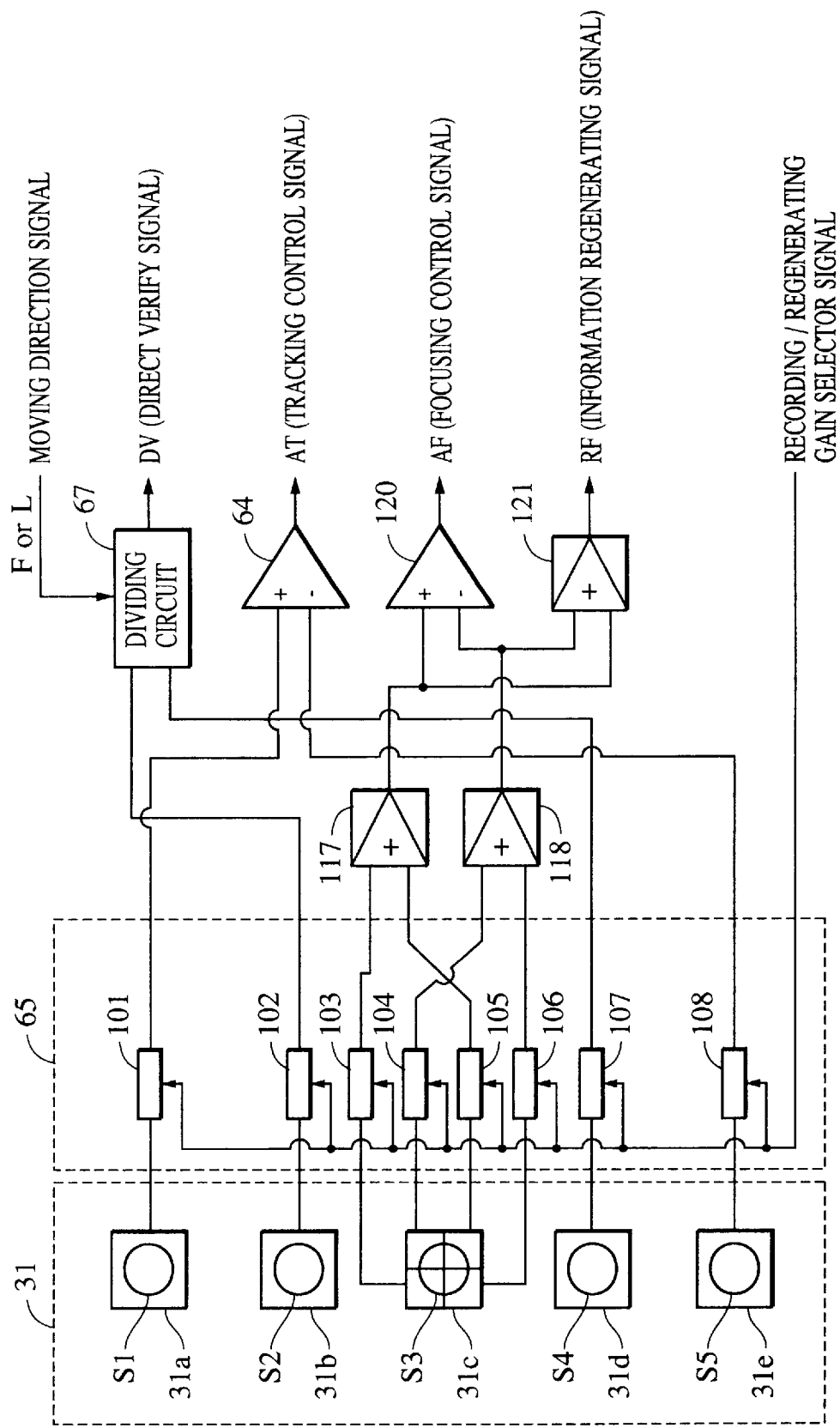
FIG. 11 is a circuit diagram showing the details of the signal processing circuit of the embodiment shown in FIG. 10.

The second embodiment of the present invention will now be described with reference to the accompanying drawings. FIG. 10 is the diagram showing the configuration of the second embodiment of the optical information recording and reproducing apparatus in accordance with the present invention. FIG. 11 is the circuit diagram showing the details of the signal processing circuit of the second embodiment. In FIG. 10 and FIG. 11, the same components as those of FIG. 6 and FIG. 7 are assigned the same reference numerals and the description thereof will be omitted.

The second embodiment is different from the first embodiment in that a dividing circuit 67 is provided in the stage following the recording/reproducing gain selector circuit 65. In the recording/reproducing gain selector circuit 65, the output signals of the gain selector circuits 102 and 107 for changing the gains of the verifying signals are output to the dividing circuit 67. The dividing circuit 67 functions to remove spiky noises which occur at the time of changing the gain as it will be discussed in detail later.

Figure 12:
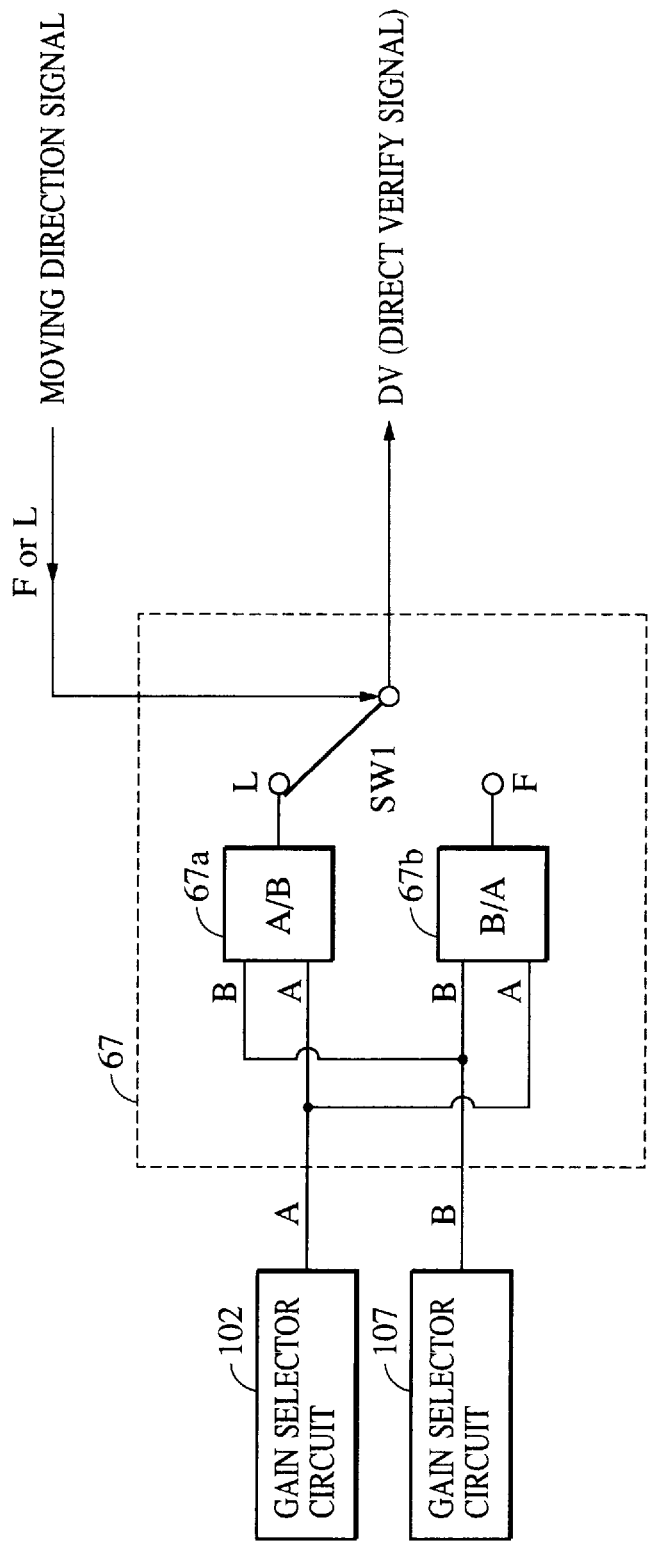
FIG. 12 is a circuit diagram showing a specific example of a dividing circuit of the embodiment shown in FIG. 10.

FIG. 12 shows the configuration of the specific example of the dividing circuit 67. In FIG. 12, reference numerals 67a and 67b both denote dividing circuits and SW1 denotes a selector switch for selecting either the dividing circuit 67a or 67b according to the moving direction signal which indicates the scanning direction of light spots and which is issued from the MPU 62. The output signals of the gain selector circuits 102 and 107 are applied to the dividing circuits 67a and 67b. In this drawing, the output signal of the gain selector circuit 102 for the verifying light receiving element 31b is denoted as A and the output signal of the gain selector circuit 107 for the verifying light receiving element 31d is denoted as B. The dividing circuit 67a performs division of (A÷B); the dividing circuit 67b performs division of (B÷A). The setting of the selector switch SW1 is changed according to the scanning direction of light spots and the selector switch SW1 sends the output signal of either the dividing circuit 67a or 67b to the MPU 62.

This embodiment is designed to select the output signal of either the dividing circuit 67a or 67b: the selected one is the output signal of the dividing circuit which divides the signal, which has been reproduced using the verifying light spot following the recording light spot, by the signal which has been reproduced using the verifying light spot preceding the recording light spot. More specifically, if the scanning direction of the light spots is F as shown in FIG. 2, wherein the verifying light spot S2 precedes the recording light spot S3 and the verifying light spot S4 follows the recording light spot S3, then the selector switch SW1 is connected to the F side to select the output signal of the dividing circuit 67b. If the scanning direction of the light spots is L, that is, if the verifying light spot S4 precedes the recording light spot S3 and the verifying light spot S2 follows the recording light spot S3, then the selector switch SW1 is connected to the L side to select the output signal of the dividing circuit 67a.

The operation of the above embodiment will now be described in conjunction with FIGS. 13(a) through 13(e). During the recording of information, the verifying light receiving elements 31b and 31d of the optical detector 31 receive the reflected light of light spot other than the reflected light of a the verifying light spots S2 and S4, i.e. the reflected light of the recording light spot S3 which is reflected from the optical card surface in the defocused state as previously mentioned. The signal level of the reflected light of the recording light spot from the surface of the optical card is denoted as $I_0$ the signal level of the reflected light of the verifying light spots is denoted as $I_1$, the degree of power modulation of the semiconductor laser at the time of recording is denoted as W, the degree of modulation based on information pits is denoted as P, and the influence of the transient response due to the change by the recording/reproducing gain selector circuit 65 is denoted as K.

Figure 13A:
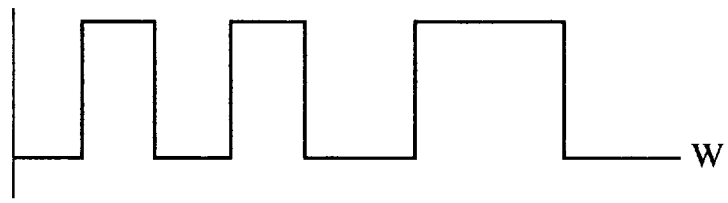
FIGS. 13(*a*) through 13(*e*) are diagrams illustrative of the signals of the respective sections of the embodiment shown in FIG. 10.
Figure 13B:
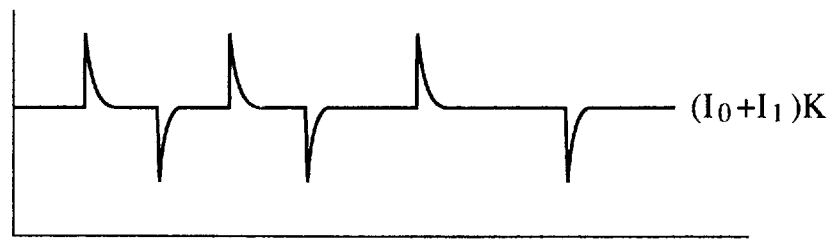

Information is recorded by scanning with five light spots S1 through S5 on the information tracks on the optical card 1 as shown in FIG. 2 so as to perform verifying at the same time as the recording of the information. FIG. 13(a) shows the power modulation waveform of the then recording light spot; since the optical beam of the semiconductor laser 21 is divided into a plurality of optical beams, other light spots are also subjected to the same power modulation. FIG. 13(b) shows the waveform of the verifying signal which has been reproduced by the verifying light spot which precedes the recording light spot; since the signal precedes the recording light spot, no information pit is recorded on the information tracks and therefore no modulation component from information pits is included. Hence, the verifying signal reaches a fixed level from the gain changeover and turns into a signal which contains signal component $I_1$ from the reflected light of the verifying light spot and signal component $I_0$ attributable to the reflected light from the surface of the optical card. The spiky noise K, however, is produced due to the transient response to the change of the gain. Thus, the resulting signal level is $(I_0+I_1)K$.

Figure 13C:
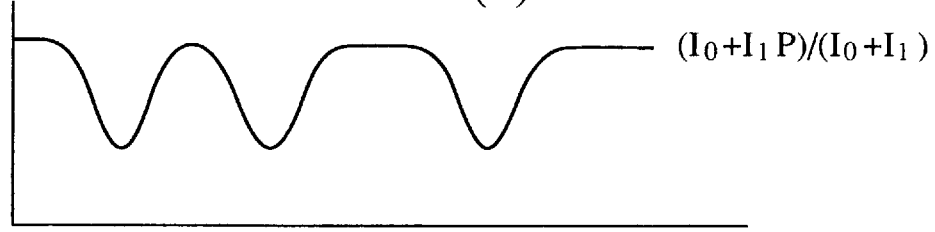
Figure 13D:
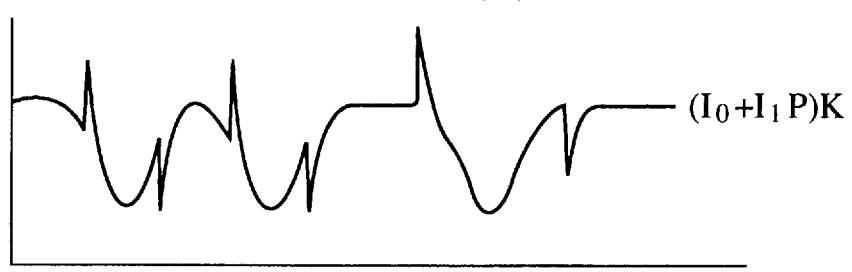

FIG. 13(d) shows the waveform of the verifying signal which has been reproduced by the verifying light spot which follows the recording light spot; the signal comes after the recording light spot and therefore it includes modulation component $I_1 \cdot P$ because of the information pit which has been recorded by the recording light spot, signal component $I_0$ attributable to the reflected light from the optical card surface, and spiky noise K due to the transient response of the gain change. Thus, the resulting signal level is $(I_0+I_1 \cdot P)K$.

The dividing circuit 67 consists of the two dividing circuits 67a and 67b as described above and the selector switch SW1 selects and outputs the output signal of the dividing circuit which divides the signal, which has been reproduced using the verifying light spot following the recording light spot, by the signal which has been reproduced using the verifying light spot preceding the recording light spot. Hence, a division value X of the then selected dividing circuit is given by:

$$X = (I_0 + I_1 \cdot P)K/(I_0 + I_1)K \quad (1)$$
$$= (I_0 + I_1 \cdot P)/(I_0 + I_1)$$

Dividing the signal of FIG. 13(d) by the signal of FIG. 13(b) gives the verifying signal of FIG. 13(c) which is free of influence K attributable to the transient response at the time of gain change, i.e. the spiky noises due to the transient response. Signal component $I_0$ attributable to the reflected light from the surface of the optical card is added as the offset; however, the verifying signal after the division contains the modulation component attributable to the pure information pit, thus making it possible to extract the signal from which the spiky noise component due to the gain change has been removed.

Figure 13E:
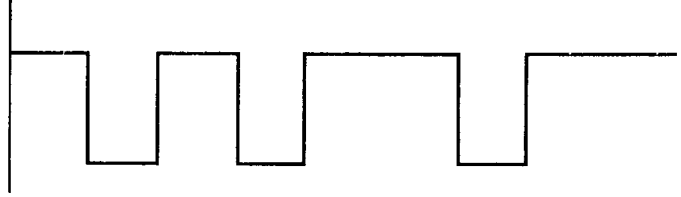

The verifying signal of FIG. 13(c) is sent to the MPU 62 and converted to a binary signal as illustrated in FIG. 13(e). The MPU 62 compares the binary signal with the recording signal to perform verifying while recording at the same time. As previously mentioned, the noise component due to the transient response at the time of gain changeover has been removed from the verifying signal; therefore, the binary signal of FIG. 13(e) is free from the pseudo-signal attributable to the transient response at the time of gain changeover and a consequent decrease in the information signal width corresponding to an information pit as in the conventional apparatus. Thus, a binary signal which has accurately been reproduced from the recording signal can be obtained, thereby enabling accurate verifying to be achieved.

Upon completion of the recording of the information on the information tracks of the optical card 1, the MPU 62 switches the connection of the selector switch SW1 according to the moving direction signal so as to select the different dividing circuit used for verifying. For instance, if the previous scanning direction of the light spots was F and the dividing circuit 67b was selected, then the connection of the selector switch SW1 is changed over to the L side and the output signal of the dividing circuit 67a is selected for this time. In other words, whenever the scanning direction of the light spots is reversed, the positional relationship between the preceding light spot and the following light spot of the recording light spot is also reversed; therefore, the dividing circuit to be selected is switched according to the scanning direction of the light spots so that the signal, which has been obtained by dividing the signal reproduced by the following verifying light spot by the signal reproduced by the preceding verifying light spot, is always used for verifying. Thus, the dividing circuit to be selected is switched in accordance with the scanning direction of the light spots to record and verify information on the way and the way back on the optical card 1.

Figure 14:
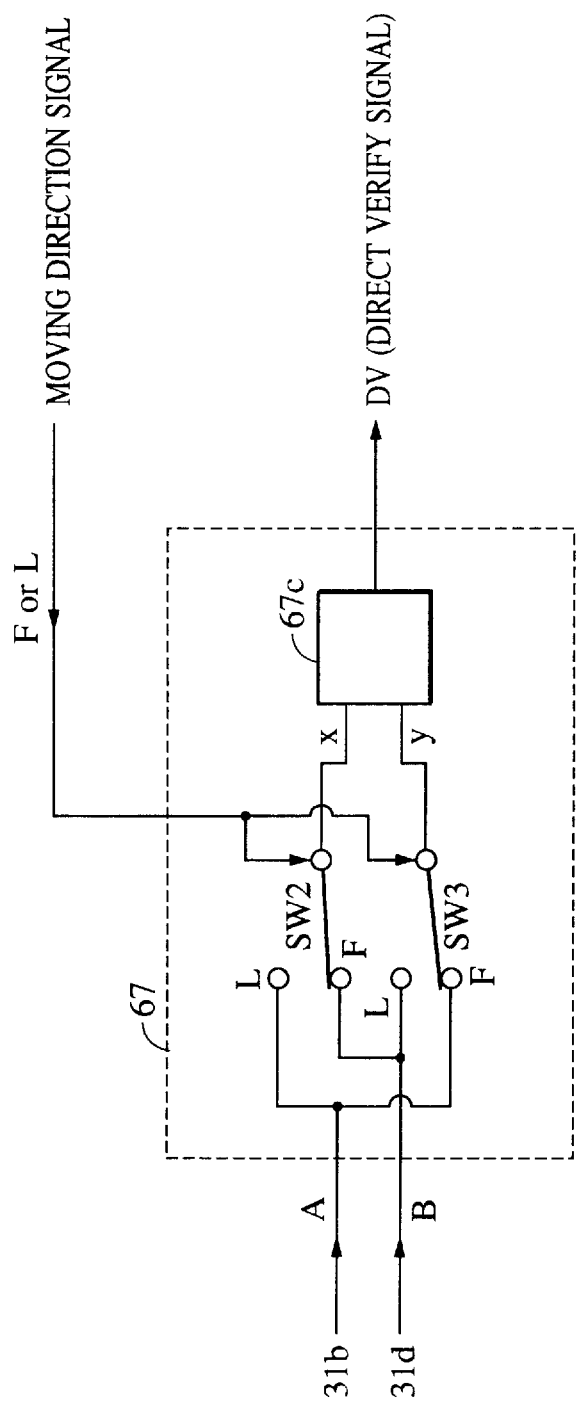
FIG. 14 is a circuit diagram showing another example of the dividing circuit.

Another embodiment of the dividing circuit 67 will now be described. FIG. 14 is the circuit diagram illustrative of the dividing circuit 67 of this embodiment. In this embodiment, the dividing circuit 67 is comprised of a single dividing circuit 67c and two selector switches SW2 and SW3. The connection of the two selector switches SW2 and SW3 is changed in accordance with the scanning direction of light spots. To be more specific, when the light spots are run in the direction F as shown in FIG. 2, the selector switches SW2 and SW3 are both connected to the F side according to the moving direction signal received from the MPU 62, the signal from the light receiving element 31b is applied to terminal y of the dividing circuit 67c, and the signal from the light receiving element 34d is applied to terminal x of the dividing circuit 67c. The dividing circuit 67c divides the input signal of terminal x by the input signal of terminal y: when the signal from the light receiving element 31b is taken as A and the signal from the light receiving element 31d as B, the value obtained by dividing B by A is sent as the direct verifying signal to the MPU 62. In other words, when the light spots are run in the direction F, the verifying light spot S2 precedes the recording light spot S3 and the light spot S4 follows the recording spot S3 as shown in FIG. 2; therefore, signal B of the light receiving element 31d which receives the reflected light of the light spot S4 is divided by signal A of the light receiving element 31b which receives the reflected light of the light spot S2; thus, the following signal is divided by the preceding signal.

If the scanning direction of the light spots is the direction L, then the selector switches SW2 and SW3 are connected to the L side, so that the signal from the light receiving element 31b is applied to terminal x of the dividing circuit 67c and the signal from the light receiving element 31d is applied to terminal y. Hence, in this case, the dividing circuit 67c divides signal A from the light receiving element 31b by signal B from the light receiving element 31d and issues the value, which is obtained by dividing A by B, as the direct verifying signal to the MPU 62. In other words, when the light spots are run in the direction L, the light spot S4 precedes the recording light spot and the light spot S2 follows it as shown in FIG. 2; therefore, signal A of the light receiving element 31b which receives the reflected light of the light spot S2 is divided by signal B of the light receiving element 31d which receives the reflected light of the light spot S4; thus, the following signal is divided by the preceding signal in this case also.

Thus, the connection of the two selector switches SW2 and SW3 is changed according to the scanning direction of the light spots and the signals supplied to the two input terminals of the dividing circuit 67c are switched between the preceding signal and the following signal, thereby ensuring that the following signal is always divided by the preceding signal regardless of the way or the way back on the optical card as in the case illustrated in FIG. 12. Normally, the dividing circuits are more expensive than the selector switches. Since this embodiment requires only one dividing circuit, it can be fabricated at lower cost than the apparatus shown in FIG. 12.

In the embodiment described above, the signal which has been reproduced by the verifying light spot following the recording light spot is divided by the signal which has been reproduced by the verifying light spot preceding the recording light spot. However, the relationship of the signals involved in the division may be switched; the signal which has been reproduced by the light spot preceding the recording light spot may be divided by the signal reproduced by the light spot following the recording light spot and the resulting signal may be employed for the direct verifying. In this case, quotient X' is represented by expression (1) with the denominator and the numerator switched as shown below:

$$X' = (I_0 + I_1)/(I_0 + I_1 \cdot P) \quad (2)$$

The influence of the transient response at the time of gain change can be removed. In this case also, signal component $I_0$ attributable to the reflected light from the surface of the optical card is added as the offset. Quotient X' becomes 1/X of expression (1) and the signal level is decreased; therefore, the signal after the division should be amplified.

The embodiment described above refers to the example of the apparatus employing the optical card as the recording medium; however, the present invention can be applied also to other apparatuses which employ optical disks, magneto-optical disks, or the like. In such a case, the direction of rotation of the disk recording medium is usually fixed and the scanning direction of the light spots is accordingly fixed; therefore, no selector switch is required and only one dividing circuit is required. This is true with a case wherein the light spots are scanned only in one direction to record information on an optical card. As a dividing circuit, it is obvious that the signal which has been reproduced by the light spot following the recording light spot may be divided by the signal which has been reproduced by the light spot preceding the recording light spot or vice versa. As mentioned above, however, when dividing the preceding signal by the following signal, the signal level is smaller; therefore, it is desirable to divide the preceding signal by the following signal.

Figure 15:
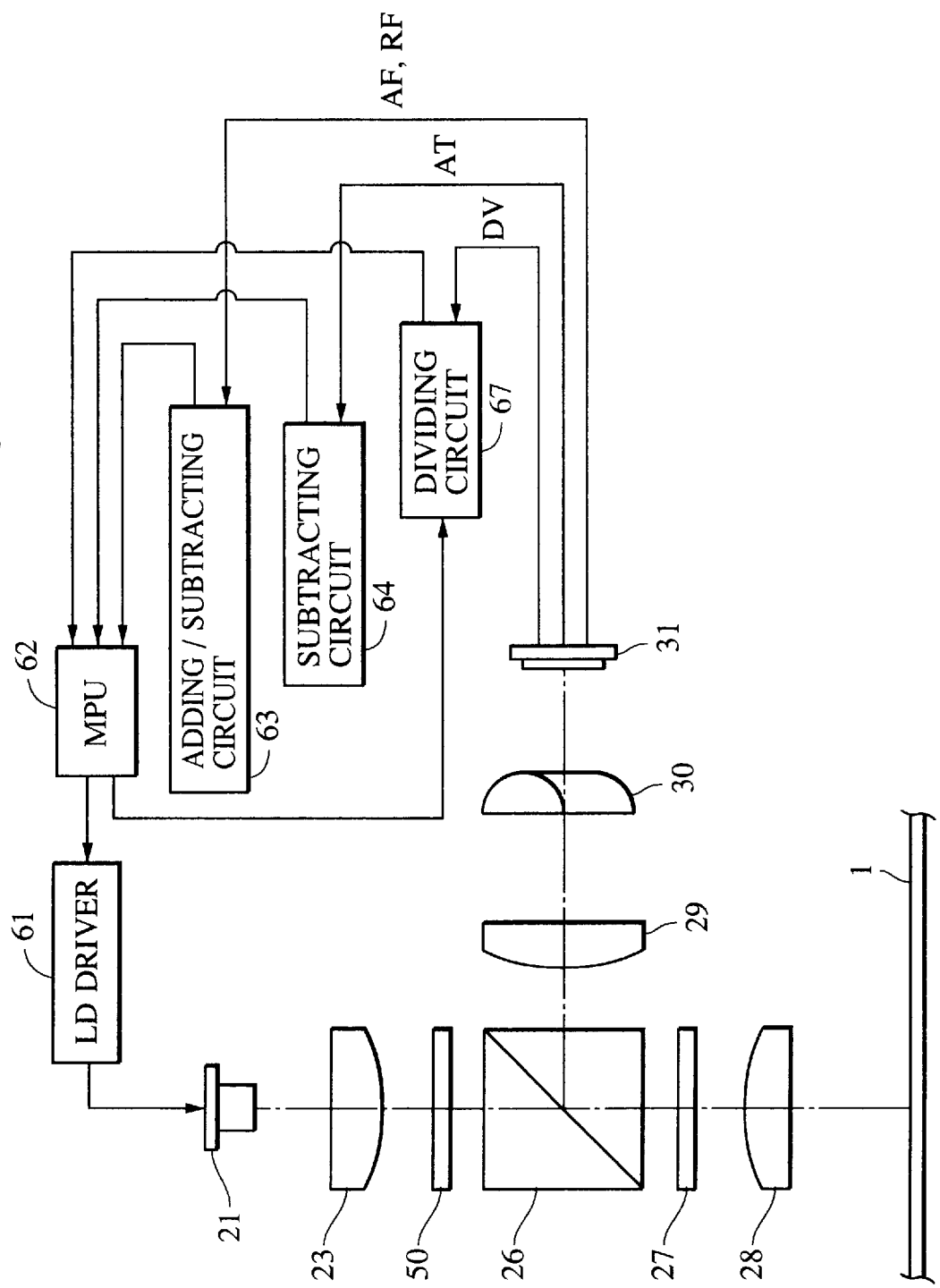
FIG. 15 is a diagram showing the configuration of another mode of the second embodiment in accordance with the present invention.

Another mode of the second embodiment in accordance with the present invention will now be described. The previous embodiment is provided with the recording/reproducing gain selector circuit 65 to remove the power modulation component contained in the verifying signal and the like; however, changing the gain may not be necessary depending on the recording sensitivity characteristics of the recording medium. More specifically, when the sensitivity characteristics of the recording medium are good and the ratio of high power to low power is high, the gain of each signal must be changed accordingly; otherwise, however, the gain selector circuit is unnecessary. FIG. 15 shows the configuration of the embodiment where the gain selector circuit is not required. In FIG. 15, the same components as those of the embodiment shown in FIG. 10 are given the same reference numerals.

Figure 16:
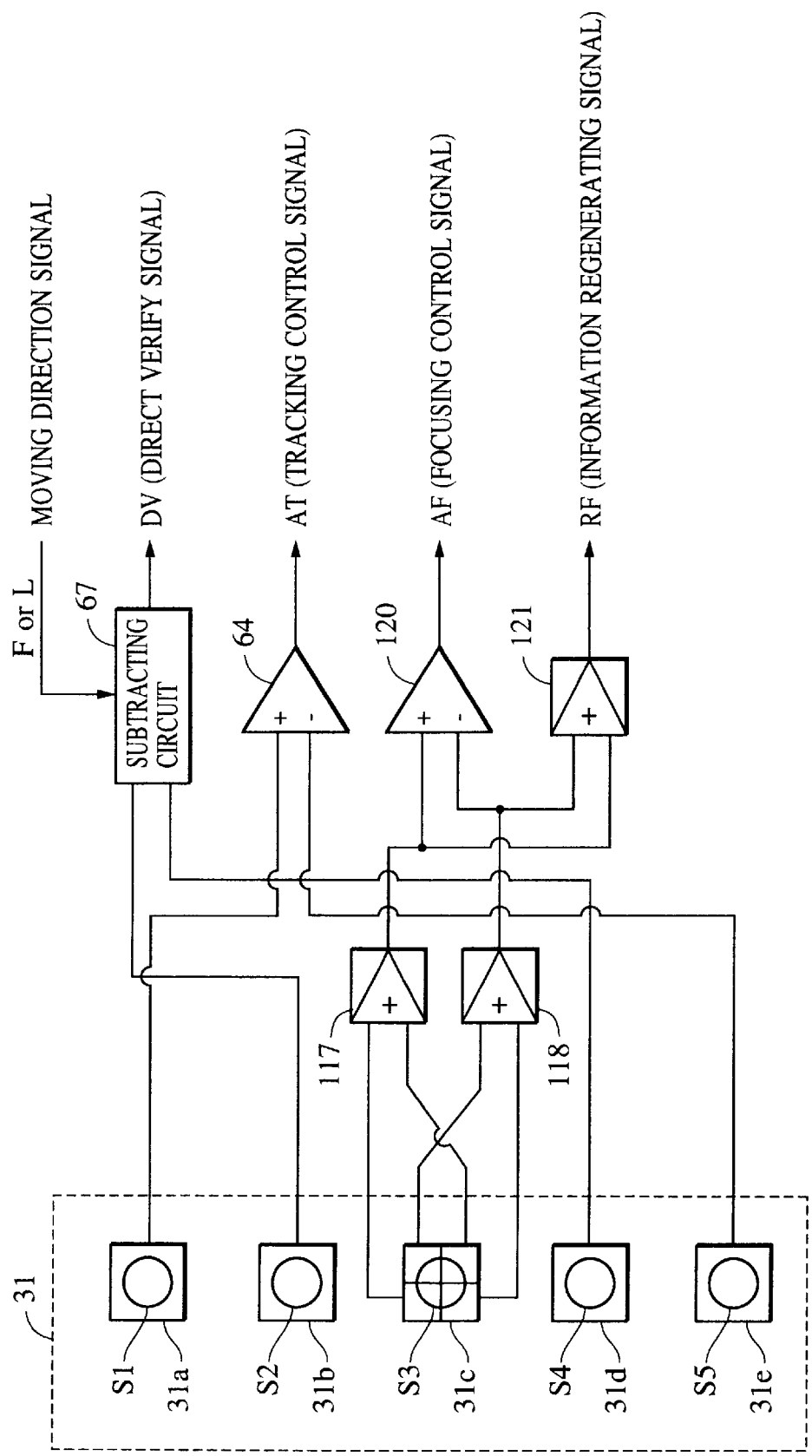
FIG. 16 is a circuit diagram showing the details of the signal processing circuit of the embodiment shown in FIG. 15.

This embodiment, as stated above, is not provided with the recording/reproducing gain selector circuit 65; the signals of the respective light receiving elements of the optical detector 31 are directly supplied to the adding/subtracting circuit 63, the subtracting circuit 64, and the dividing circuit 67. The same dividing circuit 67 as that shown in FIG. 12 or FIG. 14 is employed. The rest of the configuration is identical to that shown in FIG. 10. FIG. 16 is the circuit diagram showing the details of the signal processing circuit of the embodiment; the same components as those of the signal processing circuit shown in FIG. 11 are assigned the same reference numerals. In FIG. 16 also, no recording/reproducing gain selector circuit 65 is provided and the output signals of the respective light receiving elements of the optical detector 31 are directly applied to the associated circuits. The rest of the configuration is identical to that shown in FIG. 11; the subtracting circuit 64 issues the AT control signal, the subtracting circuit 120 issues the AF control signal, the adding circuit 121 issues the information reproducing signal, and the dividing circuit 67 issues the verifying signal based on the scanning direction of the light spots.

Figure 17A:
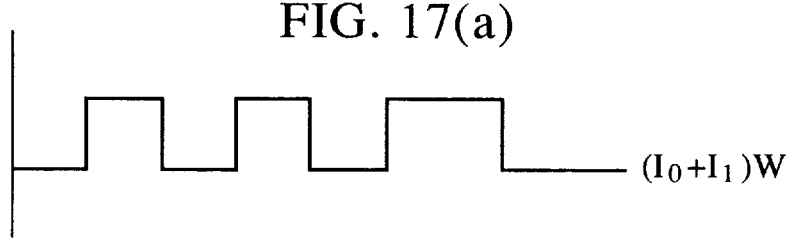
FIGS. 17(*a*) through 17(*d*) are diagrams showing the signals of the respective sections of the embodiment shown in FIG. 15.

The operation of the embodiment will now be described with reference to FIGS. 17(a) through 17(d). In this embodiment also, five light spots are run on the information tracks of the optical card 1 as shown in FIG. 2 so as to record information and verify the recorded information while recording at the same time. FIG. 17(a) shows the output signals of the light receiving element 31b or 31d for detecting the reflected light of the verifying light spot which precedes the recording light spot. Reference character W denotes the degree of modulation of the recording power and reproducing power of the semiconductor laser 21; reference character $I_0$ denotes the signal level based on the reflected light from the surface of the optical card; and reference character $I_1$ denotes the signal level based on the reflected light of the verifying light spot. This embodiment does not change the gains of the signals; therefore, the verifying signal which precedes the recording light spot contains the power modulation component, leading to $(I_0 + I_1)W$ as shown in FIG. 17(a).

Figure 17B:
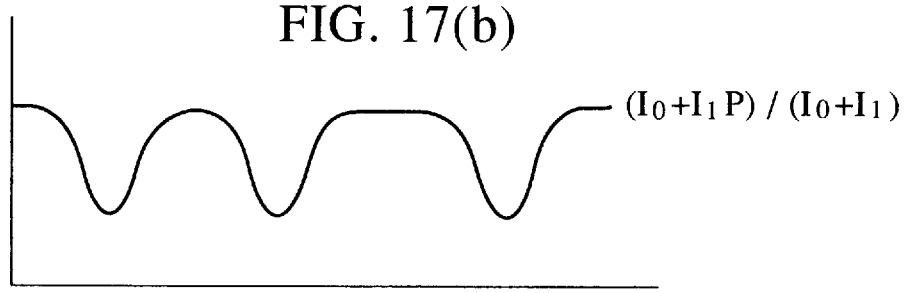
Figure 17C:
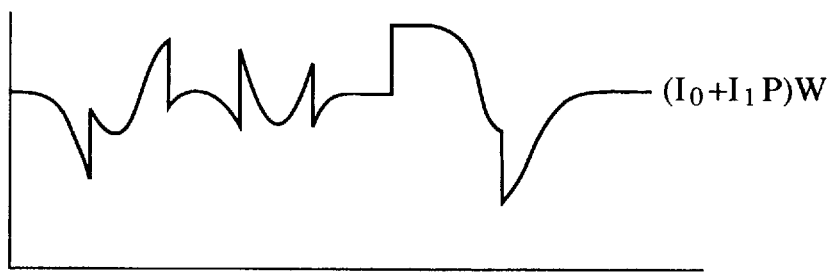
Figure 17D:
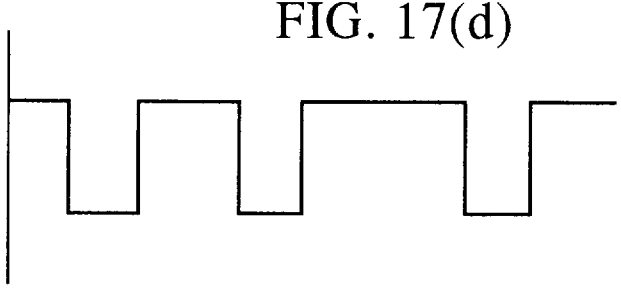

FIG. 17(c) shows the output signal of the light receiving element for detecting the reflected light of the verifying light spot which follows the recording light spot. The following verifying light spot includes the power modulation component just like the case of the preceding verifying light spot and it also contains the modulation component attributable to the information pit recorded by the recording light spot. As a result, the following verifying signal will be $(I_0 + I_1 \cdot P)W$ as shown in FIG. 17(c); P indicates the degree of modulation based on the information pit. The preceding and following verifying signals shown in FIG. 17(a) and FIG. 17(c) are supplied to the dividing circuit 67 wherein the following verifying signal is divided by the preceding verifying signal. Specifically, the MPU 62 selects either 67a or 67b in accordance with the scanning direction of the light spots, thereby dividing the following signal by the preceding signal.

Quotient Y obtained by dividing the following verifying signal by the preceding verifying signal is given by:

$$\begin{aligned} Y &= (I_0 + I_1 \cdot P)W/(I_0 + I_1)W \\ &= (I_0 + I_1 \cdot P)/(I_0 + I_1) \end{aligned} \quad (3)$$

Thus, the power modulation component can be removed. FIG. 17(b) shows the verifying signal obtained by dividing the following signal by the preceding signal; it can be seen that the verifying signal does not contain the power modulation component and only the modulation component attributable to the information pit has been extracted. In this embodiment also, however, signal component $I_0$ attributable to the reflected light from the surface of the optical card is added as the offset. Upon completion of the scanning of the information tracks in one direction, the connection of the selector switch is changed according to the scanning direction of the light spots as in the case of the previous embodiment and the information is recorded and verified on the way and the way back on the optical card I.

In this embodiment, even if the gain of the verifying signal is not changed according to the modulation of the information signal, the power modulation component can be removed from the verifying signal by dividing the following signal by the preceding signal. This means that the same effect as that obtained by changing the gain of the verifying signal can be obtained; in addition, the absence of noises caused by changing the gain makes it possible to obtain a verifying signal which reproduces an information pit more accurately.

In this embodiment also, the following signal is divided by the preceding signal, however, the relationship of the signals involved in the division may be switched. Dividing the preceding signal by the following signal, however, results in a smaller signal level as mentioned above, so that the signal should be appropriately amplified. Further, this embodiment also refers to the example of the apparatus employing the optical card as the recording medium; however, the present invention can be applied also to other apparatuses which employ optical disks, magneto-optical disks, or the like. In such a case, the direction of rotation of the disk recording medium is usually fixed and the scanning direction of the light spots is accordingly fixed; therefore, no selector switch for switching the dividing circuits shown in FIG. 12 is required and there is no need to switch between the input signals to the dividing circuits by the selector switches as shown in FIG. 14. This is true with a case wherein the light spots are run for scanning only in one direction to record information on an optical card. In such a case, the following signal may be divided by the preceding signal, or vice versa.

Further, in the embodiment stated above, the dividing circuit for dividing the verifying signal may be operated at all times whether the apparatus is recording or reproducing; however, it is desirable to stop the dividing operation by issuing a halt command from the MPU for an operation other than the recording operation which involves verifying. This is because, if the dividing operation is carried out at all times, then the verifying signals are issued to the MPU during reproduction also and the MPU accordingly has to perform wasteful processing, resulting in time loss in information processing at the time of reproduction. The load on the MPU should be reduced by carrying out the dividing procedure only during recording.

Third Embodiment

Figure 18:
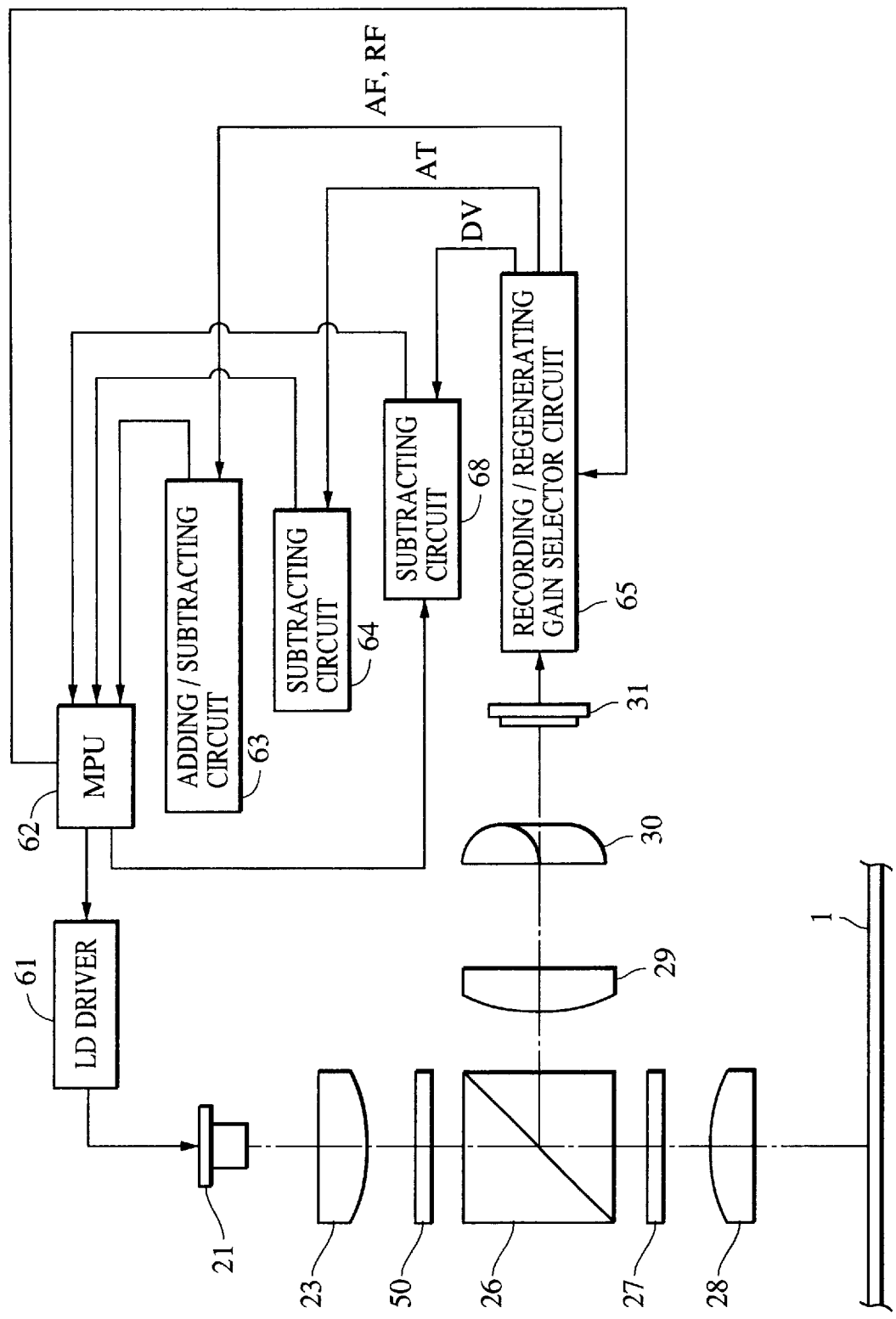
FIG. 18 is a diagram showing the configuration of a third embodiment of the optical information recording and reproducing apparatus in accordance with the present invention.
Figure 19:
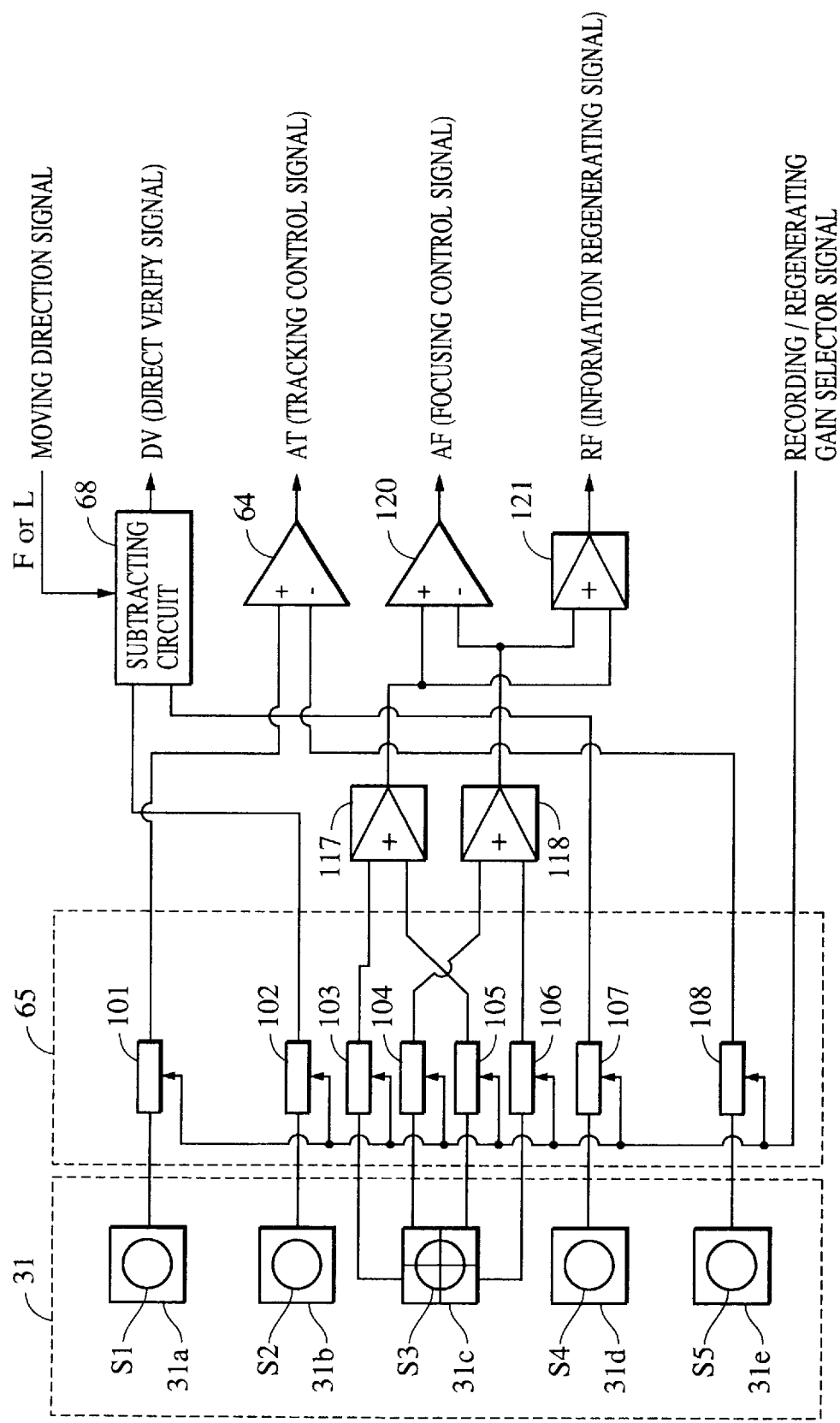
FIG. 19 is a circuit diagram showing the details of the signal processing circuit of the embodiment shown in FIG. 18.

The third embodiment of the present invention will now be described with reference to the accompanying drawings. FIG. 18 shows the configuration of the third embodiment of the optical information recording and reproducing apparatus in accordance with the present invention. FIG. 19 is the circuit diagram showing the details of the signal processing circuit of the third embodiment. In FIG. 18 and FIG. 19, the same components as those shown in FIG. 6 and FIG. 7 are assigned the same reference numerals and the description thereof will be omitted.

The third embodiment is different from the first embodiment in that the stage following the recording/reproducing gain selector circuit 65 is provided with a subtracting circuit 68. The verifying signal among the output signals of the recording/reproducing gain selector circuit 65 is sent to the subtracting circuit 68. As will be discussed in detail later, the subtracting circuit 68 carries out subtraction between the two signals of the gain selector circuits 102 and 107, which are included in the recording/reproducing gain selector circuit 65 and which change the gain of the verifying signal, and it removes the signal component which is attributable to the reflected light from the surface of the optical card which is contained in the verifying signal.

Figure 20:
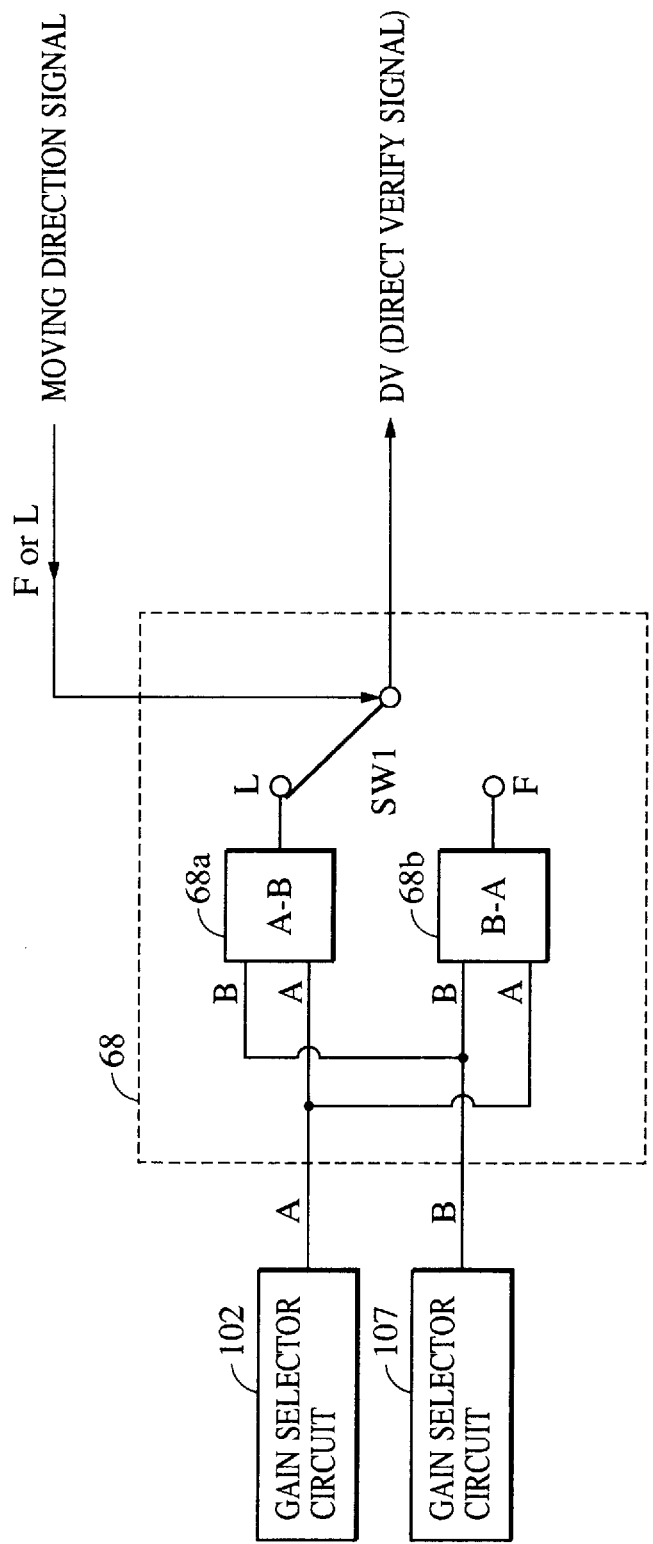
FIG. 20 is a circuit diagram showing a specific example of a subtracting circuit of the embodiment shown in FIG. 18.

FIG. 20 shows the configuration of the specific example of the subtracting circuit 68. In FIG. 20, reference numerals 68a and 68b denote subtracting circuits and SW 1 denotes a selector switch for selecting either the subtracting circuit 68a or 68b according to the moving direction signal which indicates the scanning direction of the light spots and which is issued from the MPU 62. The subtracting circuits 68a and 68b respectively receive the output signals of the gain selector circuits 102 and 107 shown in FIG. 19. The output signal of the gain selector circuit 102 corresponding to the verifying light receiving element 31b is denoted as A; the output signal of the gain selector circuit 107 corresponding to the verifying light receiving element 31d is denoted as B. The subtracting circuit 68a carries out the subtraction of (A−B); the subtracting circuit 68b carries out the subtraction of (B−A). The connection of the selector switch SW1 is changed according to the scanning direction of the light spots and it supplies the output signal of one of the subtracting circuits to the MPU 62.

In this embodiment, to select the output signal of either the subtracting circuit 68a or 68b, the output signal of the subtracting circuit which subtracts the signal, which has been reproduced by the verifying light spot preceding the recording light spot, from the signal, which has been reproduced by the verifying light spot following the recording light spot, is selected and issued. To be more specific, as shown in FIG. 2, if the scanning direction of the light spots is F, i.e. if the verifying light spot S2 precedes the recording light spot S3 and the verifying light spot S4 follows the recording light spot S3, then the selector switch SW1 is connected to the F side, so that the output signal of the subtracting circuit 68b is selected. If the scanning direction of the light spots is L, i.e. if the verifying light spot S4 precedes the recording light spot S3 and the verifying light spot S2 follows the recording light spot S3, then the selector switch SW1 is connected to the L side, so that the output signal of the subtracting circuit 68a is selected.

The operation of the embodiment will now be described in detail in conjunction with FIGS. 21(a) through 21(d). During the recording of information, the verifying light receiving elements 31b and 31d of the optical detector 31 receive the reflected light of light spots other than the reflected light of the verifying light spots S2 and S4, especially the reflected light of the recording light spot S3 which is reflected from the optical card surface in the defocused state as previously mentioned. The signal level based on the reflected light of the recording light spot from the surface of the optical card is denoted as $I_0$, the signal level based on the reflected light of the verifying light spots is denoted as $I_1$, the degree of power modulation of the semiconductor laser at the time of recording is denoted as W, and the degree of modulation based on an information pit is denoted as P.

Figure 21A:
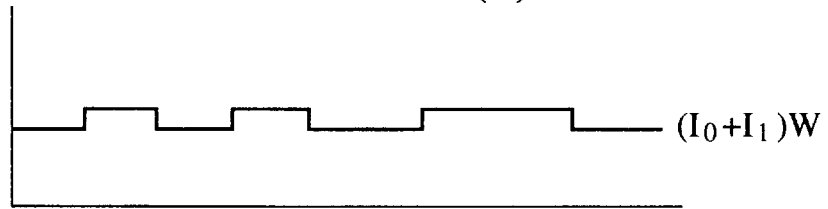
FIGS. 21(*a*) through 21(*d*) are diagrams illustrative of the signals of the respective sections of the embodiment shown in FIG. 18.

Information is recorded by scanning the information tracks on the optical card 1 with five light spots as shown in FIG. 2 so as to perform verifying while recording information at the same time. FIG. 21(a) shows the output signal of the verifying light receiving element 31b or 31d for detecting the verifying light spot which precedes the then recording light spot. When recording information, the optical beam of the semiconductor laser 21 is modulated according to the information signal; the signal component of the recording light spot reflected in the defocused state from the surface of the optical card enters the verifying light receiving element. Hence, the output signal of the preceding verifying light receiving element will be $(I_0+I_1)W$ which results from adding the signal component attributable to the reflected light, which has been modulated as shown in FIG. 21(a) and which comes from the surface of the optical card, and the signal component attributable to the reflected light of the verifying light spot. This means that the preceding verifying light spot always runs on unrecorded information tracks and therefore, the signal of the verifying light receiving element indicates a value obtained by adding the verifying signal component, which has not been subjected to the modulation due to the information pit, and the signal component which has been subjected to the power modulation attributable to the reflected light from the surface of the optical card.

Figure 21B:
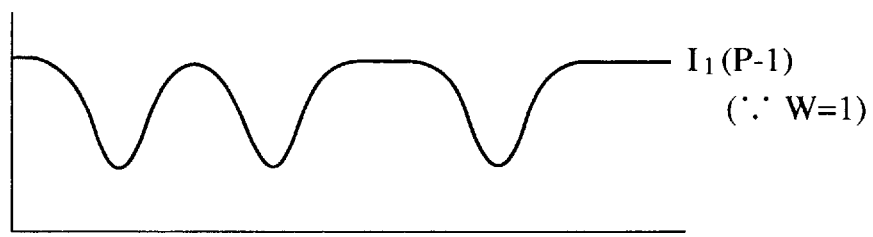
Figure 21C:
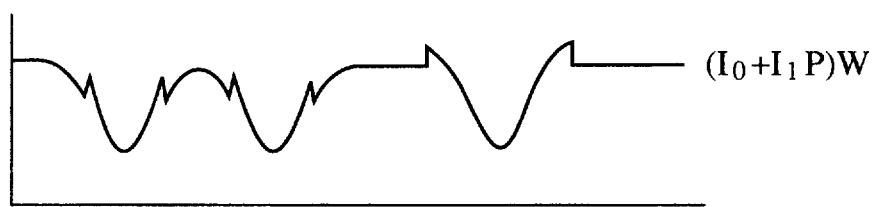

FIG. 21(c) shows the output signal of the verifying light receiving element for detecting the reflected light of the verifying light spot which follows the recording light spot. Since the following verifying light spot runs on the information pit immediately after it has been recorded by the recording light spot, the output signal of the following verifying light receiving element exhibits the signal waveform which contains the modulation component attributable to the information pit in addition to the component of the preceding signal; the resulting waveform is $(I_0+I_1 \cdot P)W$ as shown in FIG. 21(c). The signal of FIG. 21(a) and the signal of FIG. 21(c) are supplied to the subtracting circuit 68 which subtracts the preceding verifying signal from the following verifying signal as stated above. More specifically, the MPU 62 selects either the subtracting circuit 68a or 68b to subtract the preceding signal from the following signal. Value X obtained by subtracting the preceding signal from the following signal is given by:

$$X = (I_0 + I_1 \cdot P)W - (I_0 + I_1)W \qquad (1)$$
$$= I_1(P-1)W$$

The signal obtained after the subtraction is shown in FIG. 21(b). The gain, however, is changed by the recording/reproducing gain selector circuit 65 in actual use and W can be considered to be 1; therefore, value X resulting from the subtraction is given by:

$$X = I_1(P-1) \qquad (2)$$

Figure 21D:
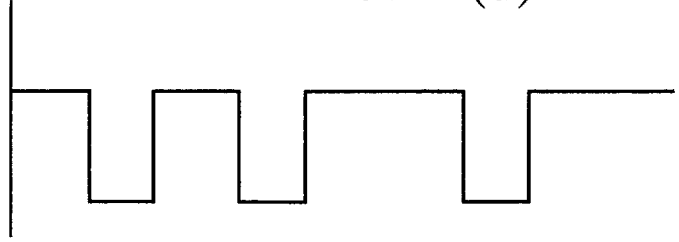

The signal is sent as the verifying signal to the MPU 62 which converts it to a binary signal as shown in FIG. 21(d). The MPU 62 compares the binary signal with the recording signal to perform verifying while recording at the same time. Upon completion of the recording on the information tracks in one direction, the MPU 62 changes the connection of the selector switch SW1 to select the subtracting circuit according to the scanning direction of the light spots so as to perform verifying while recording at the same time.

In this embodiment, as it is obvious from expression (2), the component of the verifying signal does not include signal component $I_0$ attributable to the reflected light from the surface of the optical card; thus, unwanted signal component $I_0$ attributable to the reflected light from the surface of the optical card can be removed. Since, the unwanted signal component due to the reflected light from the surface of the optical card can be eliminated, there will be no fluctuation in the information signal width which corresponds to the information pit of the binary signal when converting the verifying signal to the binary signal. This makes it possible to obtain a binary signal which has reproduced the information pit more accurately.

Figure 22:
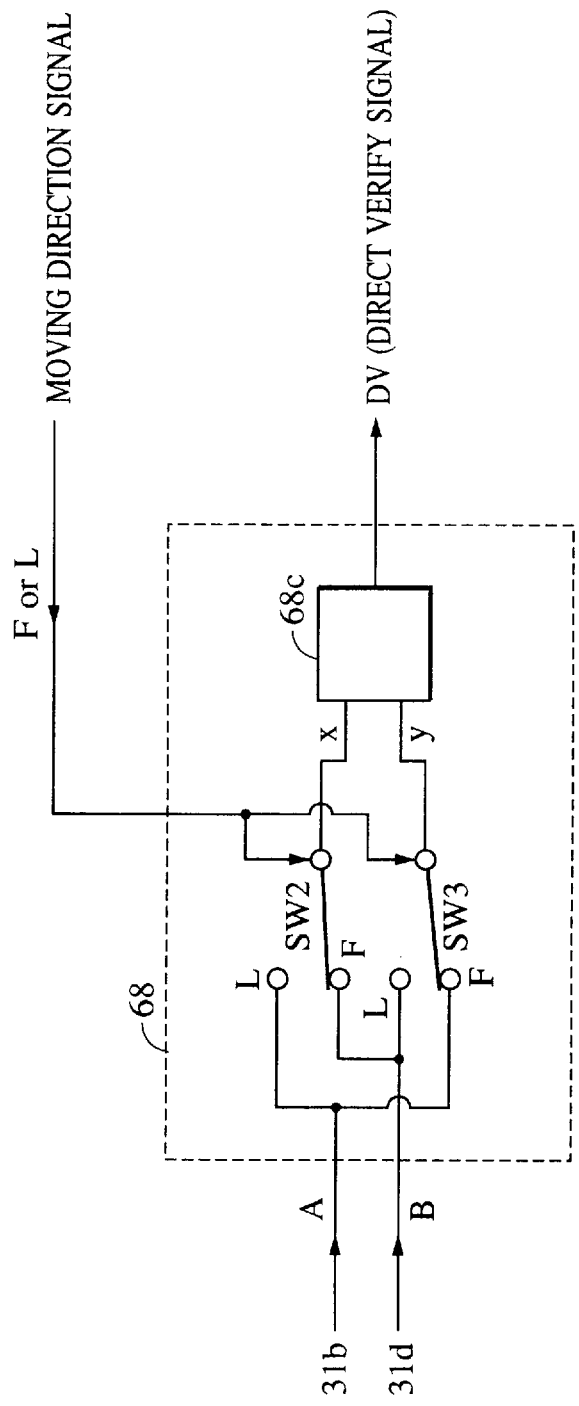
FIG. 22 is a circuit diagram showing another example of a subtracting circuit 68.

Another embodiment of the subtracting circuit 68 will now be described. FIG. 22 is the circuit diagram illustrative of the subtracting circuit 68 of this embodiment. The subtracting circuit 68 according to this embodiment has one subtracting circuit 68c and two selector switches SW2 and SW3 and it is designed to switch between the selector switches SW2 and SW3 according to the scanning direction of the light spots. To be more specific, when the light spots run in the direction F as shown in FIG. 2, the selector switches SW2 and SW3 are connected to side F according to the moving direction signal received from the MPU 62, so that the signal from the light receiving element 31b is applied to terminal y of the subtracting circuit 68c and the signal from the light receiving element 31d is applied to terminal x of the subtracting circuit 68c.

The subtracting circuit 68c subtracts the input signal at terminal y from the input signal at terminal x. When the signal from the light receiving element 31b is denoted as A and the signal from the light receiving element 31d as B, the value obtained by the subtraction of (B—A) is supplied as the direct verifying signal to the MPU 62. In other words, when the light spots run in the direction F, the verifying light spot S2 precedes the recording light spot S3 and the light spot S4 follows the recording light spot S3 as shown in FIG. 2; therefore, signal A of the light receiving element 31b for receiving the reflected light of the light spot S2 is subtracted from signal B of the light receiving element 31d for receiving the reflected light of the light spot S4; thus, the preceding signal is subtracted from the following signal.

When the scanning direction of the light spots is L, the selector switches SW2 and SW3 are connected to side L, so that the signal from the light receiving element 31b is applied to terminal x of the subtracting circuit 68c and the signal from the light receiving element 31d is applied to terminal y. In this case, therefore, the subtracting circuit 68c subtracts signal B of the light receiving element 31d from signal A of the light receiving element 31b and issues the value obtained from (A–B) to the MPU 62 as the direct verifying signal. In other words, when the light spots run in the direction L, the verifying light spot S4 precedes the recording light spot S3 and the light spot S2 follows the recording light spot S3 as shown in FIG. 2; therefore, signal B of the light receiving element 31d for receiving the reflected light of the light spot S4 is subtracted from signal A of the light receiving element 31b for receiving the reflected light of the light spot S2; thus, the preceding signal is subtracted from the following signal as mentioned above.

Thus, the connection of the two selector switches SW2 and SW3 is changed according to the scanning direction of the light spots and the signals supplied to the subtracting circuit 68c are switched between the preceding signal and the following signal, thereby ensuring that the preceding signal is always subtracted from the following signal regardless of the way or the way back on the optical card as in the case illustrated in FIG. 20. Normally, the subtracting circuits are more expensive than the selector switches. Since this embodiment requires only one subtracting circuit, it can be fabricated at lower cost than the apparatus shown in FIG. 20.

The embodiments described above relate to the apparatuses which employ a single light source, wherein the optical beam of a single semiconductor laser is divided into a plurality of optical beams to use them for recording and reproducing information, the AF and AT control, and the verifying. The present invention, however, is not limited thereto; it can also be applied to an apparatus which employs a plurality of light sources, wherein independent light sources are provided for recording, verifying, etc. In such an apparatus employing the plurality of light sources, the recording light spot reflected from the surface of the optical card reaches the verifying light receiving element in the defocused state; therefore, the signal component attributable to the unwanted reflected light from the surface of the optical card can be removed.

More specifically, in the case of the apparatus having a plurality of light sources, the signal produced by the verifying light spot which precedes the recording light spot will be $(I_0 W+I_1)$ and the signal produced by the verifying light spot which follows the recording light spot will be $(I_0 W+I_1 P)$. A value obtained by subtracting the preceding signal from the following signal is expressed as shown below:

$$X = (I_0 W + I_1 P) - (I_0 W + I_1) \qquad (3)$$
$$= I_1(P - 1)$$

The result is exactly identical to expression (2) which applies to the apparatus with the single light source, meaning that the signal component due to the unwanted reflected light from the surface of the optical card can be removed.

In this embodiment, the preceding signal is subtracted from the following signal; however, the following signal may alternatively be subtracted from the preceding signal. In this case, value X' will be $I_1 (1-P)$, meaning that the signal component due to the reflected light from the surface of the optical card can be removed. The verifying signal in this case, however, becomes negative and the signal waveform will be symmetrical to the signal waveform shown in FIG. 21(c) with respect to the zero level; therefore, it is necessary to set the slicing level for a negative value or reverse the polarity to positive when converting the verifying signal to the binary signal.

In this embodiment, the apparatus employing the optical card has been described as the example. The present invention, however, can be applied also to an apparatus which employs an optical disk, magneto-optical disk, etc.; in such a case, the scanning direction of the light spots is fixed. This means that only one subtracting circuit is required and there is no need to change the connecting of the subtracting circuit or to switch the input signals to the subtracting circuit by the selector switches. This is true with the case wherein the light spots are run only in one direction to record information on an optical card. In this case, the preceding signal may of course be subtracted from the following signal, or vice versa.

Further, in the embodiment stated above, the subtracting circuit for subtracting the verifying signal may be operated at all times whether the apparatus is recording or reproducing; however, it is desirable to stop the subtracting operation by issuing a halt command from the MPU for an operation other than the recording operation which involves verifying. This is because, if the subtracting operation is carried out during an operation other than recording, then the verifying signals are issued to the MPU and the MPU accordingly has to perform wasteful processing, resulting in time loss in information processing at the time of reproduction or the like. Hence, the operation of the subtracting circuit should be suspended during the operation other than recording which is accompanied by verifying.

Fourth Embodiment

Figure 23:
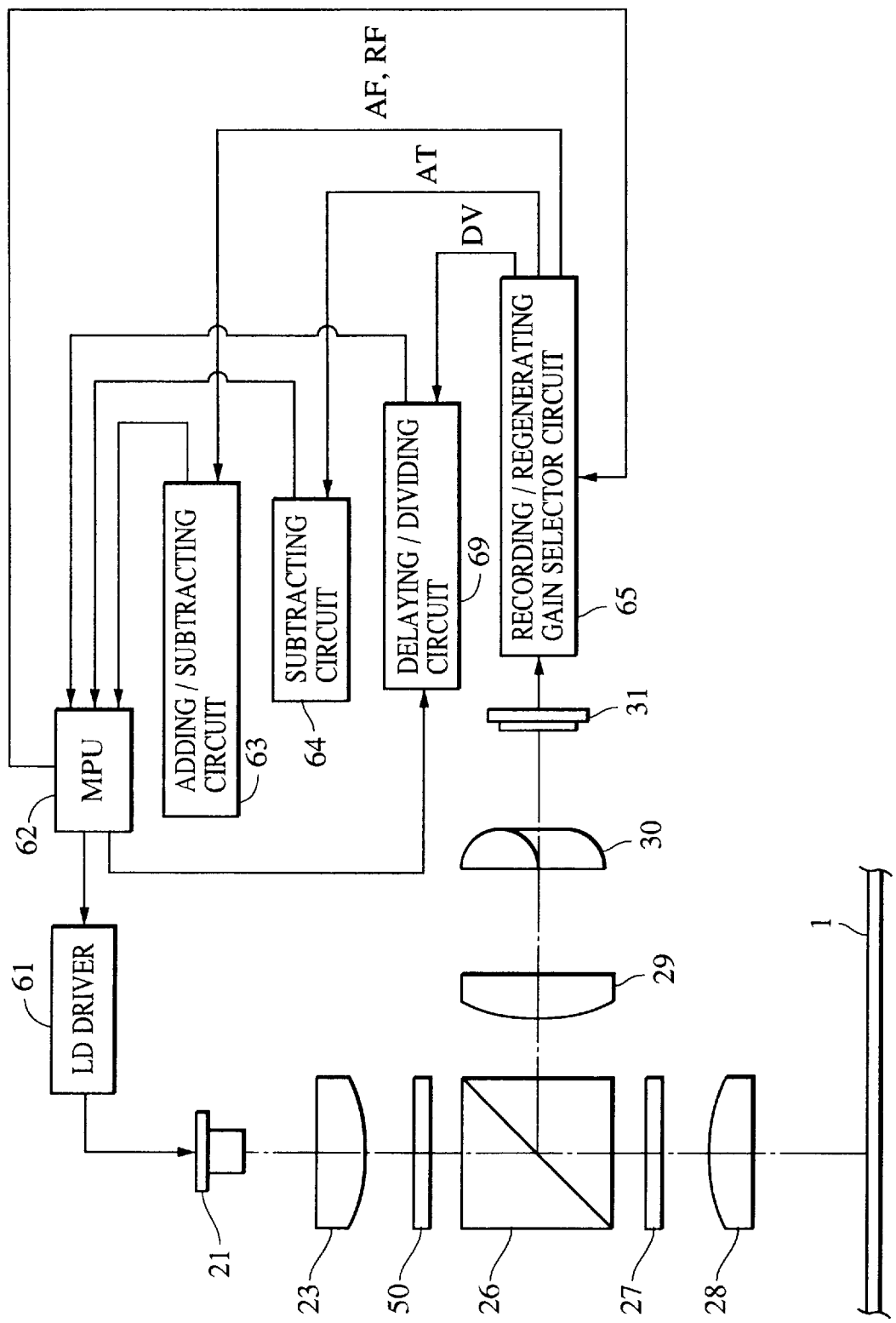
FIG. 23 is a diagram showing the configuration of a fourth embodiment of the optical information recording and reproducing apparatus in accordance with the present invention.
Figure 24:
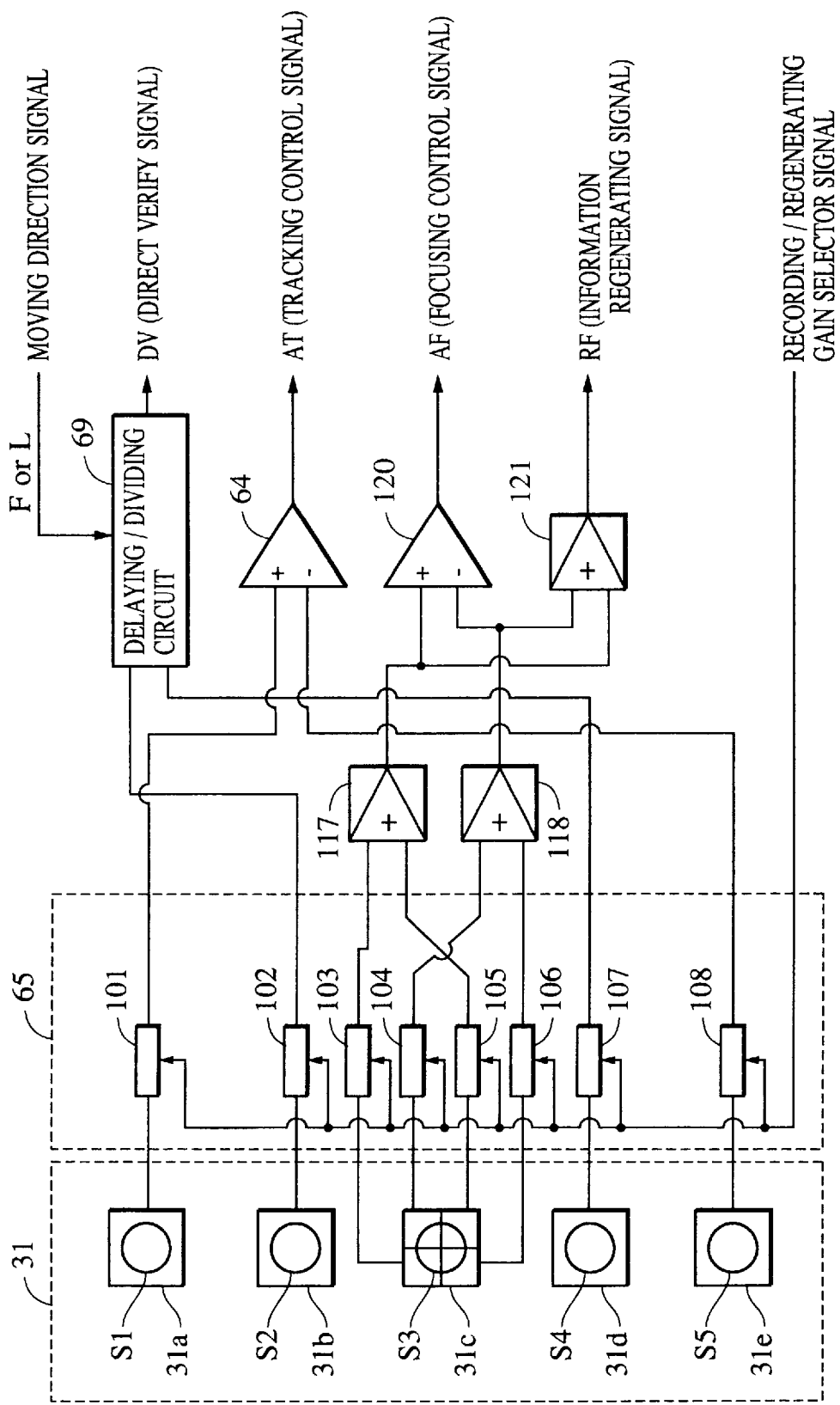
FIG. 24 is a circuit diagram showing the details of the signal processing circuit of the embodiment shown in FIG. 23.

The fourth embodiment of the present invention will now be described with reference to the accompanying drawings. FIG. 23 shows the configuration of the fourth embodiment of the optical information recording and reproducing apparatus in accordance with the present invention. FIG. 24 is the detailed block diagram showing the signal processing circuit of the fourth embodiment. In FIG. 23 and FIG. 24, the same components as those of FIG. 6 and FIG. 7 are given the same reference numerals and the description thereof will be omitted.

The fourth embodiment is different from the first embodiment in that the stage following the recording/reproducing gain selector circuit 65 is provided with a delaying/dividing circuit 69. In the recording/reproducing gain selector circuit 69, the output signals of the gain selector circuits 102 and 107 for changing the gain of the verifying signal are supplied to the delaying/dividing circuit 69. As will be discussed in detail later, the delaying/dividing circuit 69 functions to correct the fluctuations in the level of the verifying signal caused by a defect in the optical card 1.

Figure 25:
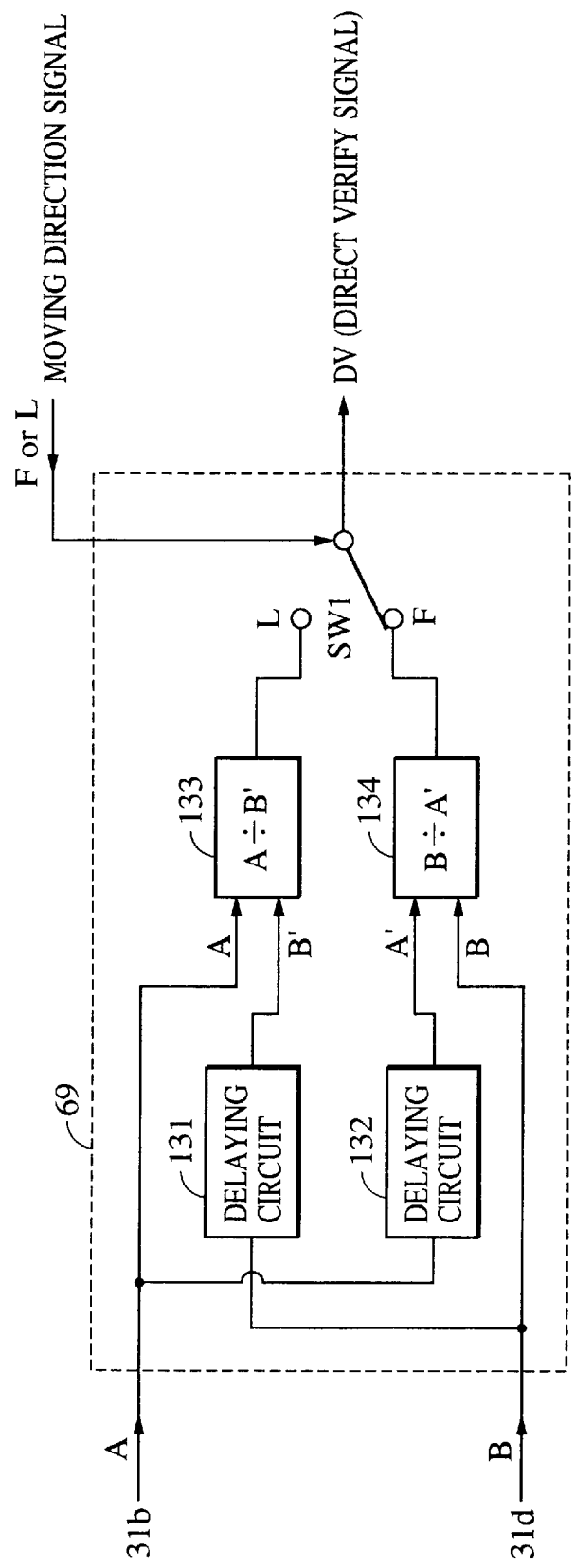
FIG. 25 is a block diagram showing an example of a delaying/dividing circuit 69 of the embodiment shown in FIG. 23.
Figure 26A:
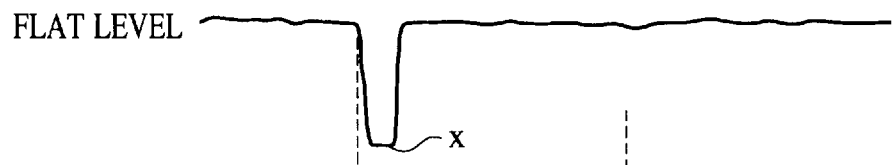
FIGS. 26(*a*) through 26(*d*) are diagrams showing the signals of the respective sections of the delaying/dividing circuit shown in FIG. 25.
Figure 26B:
Figure 26C:
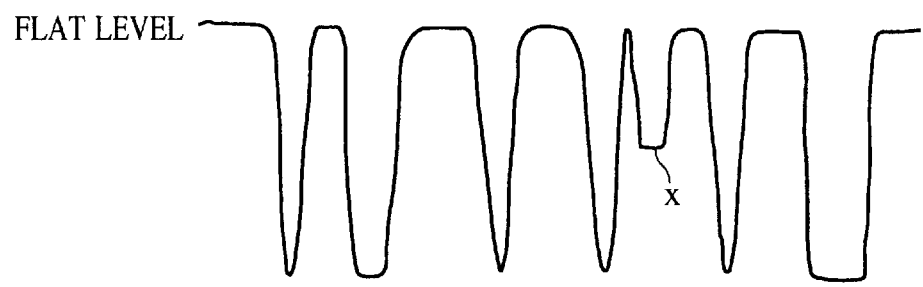
Figure 26D:
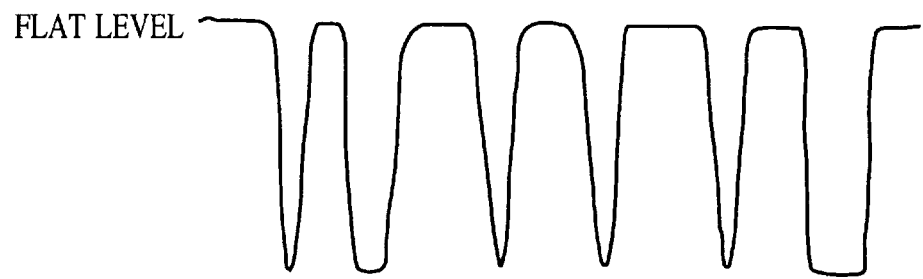

FIG. 25 is the circuit diagram showing the specific example of the delaying/dividing circuit 69. In FIG. 25, reference numerals 131 and 132 denote delaying circuits; 133 and 134 denote the dividing circuits, and SW1 denotes the selector switch. Further in FIG. 25, the verifying signal from the light receiving element 31b is denoted as A and the verifying signal from the light receiving element 31d is denoted as B. These signals A and B are of course the signals, the power modulation components of which have been corrected by the corresponding gain selector circuits of the recording/reproducing gain selector circuit 65. Verifying signal A from the light receiving element 31b is delayed by a predetermined time T through a delaying circuit 132. The dividing circuit 134 divides verifying signal B from the light receiving element 31d by signal A', which has been delayed, and it outputs the value obtained from (B÷A'). Verifying signal B from the light receiving element 31d is delayed by a predetermined time T through the delaying circuit 131. The dividing circuit 133 divides signal A from the light receiving element 31b by signal B', which has been delayed, and it outputs the value obtained from (A÷B'). Time delay T in the delaying circuits 131 and 132 is set as follows:

T=d/v where d denotes the interval between the two verifying light spots S2 and S4 shown in FIG. 2; and v denotes the relative moving velocity of the optical card and the light spots. As will be discussed later, the timing of the signal, which has been reproduced by the preceding verifying light spot, is delayed by time T so as to match it to the timing of the signal which has been reproduced by the following verifying light spot.

The output signals of the dividing circuits 133 and 134 are supplied to the selector switch SW1 and the selector switch SW1 selects and outputs one of the signals according to the moving direction signal which indicates the scanning direction of the light spots and which is issued by the MPU 62. For selecting one of the signals, the verifying signal which follows the recording light spot is divided by the signal produced by delaying the verifying signal which precedes the recording light spot. To be more specific, when the scanning direction of the light spots is F as shown in FIG. 2, the selector switch SW1 is connected to F to select the output signal of the dividing circuit 134. In other words, while the scanning direction of the light spots is F, the verifying light spot S2 precedes the recording light spot S3 and the verifying light spot S4 follows the recording light spot S3; therefore, the output signal of the dividing circuit 134 is selected and the signal obtained by dividing the following verifying signal by the delayed preceding verifying signal is used for verifying.

When the scanning direction of the light spots is L as shown in FIG. 2, the selector switch SW1 is connected to L to select the output signal of the dividing circuit 133. In other words, since the verifying light spot S4 precedes the recording light spot S3 and the verifying light spot S2 follows the recording light spot S3, the output signal of the dividing circuit 133 is selected and the signal obtained by dividing the following verifying signal by the delayed preceding verifying signal is output. Thus, the output signal of either the dividing circuit 133 or 134 is selected by the selector switch SW1 according to the scanning direction of the light spots and supplied as the DV signal to the MPU 62.

The specific operation of the embodiment will now be described in conjunction with FIG. 26. It is assumed in that, as shown in FIG. 2, the five light spots S1 through S5 are run on the information tracks of the optical card 1 to record information while verifying it at the same time and the defect mentioned above is present on the information tracks. It is also assumed that the scanning direction of the light spots is F and the selector switch SW1 of FIG. 25 is connected to F.

FIG. 26(*a*) shows the signal which has been reproduced by the verifying light spot S2 which precedes the recording light spot S3 when the light spots are run in the direction F, that is, the signal from the verifying light receiving element 31*b* of the optical detector 31. The signal is, of course, free of the power modulation component at the time of information recording because the gain is changed by the gain selector circuit 102 as described with reference to FIG. 24. The signal which precedes the recording light spot exhibits almost a fixed level as shown in FIG. 26(*a*) because the verifying light spot runs on the unrecorded information tracks and therefore no modulation component due to the information pit is detected. This signal level is normally called a flat level. FIG. 26(*a*) indicates, however, the influence exerted by the defect on the information tracks in terms of a drop X in the signal level. The preceding signal of the light receiving element 31*b* is output to the delaying circuit 132 of FIG. 25 and delayed by a predetermined time T as stated above. FIG. 26(*b*) shows the delayed signal.

FIG. 26(*c*) shows the signal which has been reproduced by the verifying light spot S4 which comes after the recording light spot S3, that is, the signal from the verifying light receiving element 31*d*. This signal is also free of the power modulation component since the gain is changed by the gain selector circuit 107. The signal contains the modulation component attributable to the information pit as shown in FIG. 26(*c*) because the verifying light spot S4 runs over the information pit immediately after recording. In this case also, since the light spot S4 runs on the defect, the influence of the defect is displayed as a drop X in the signal level. Furthermore, as illustrated in FIG. 26(*b*), since the preceding signal is delayed by time T, the timing of drop X in the level thereof coincides with the timing of drop X in the level caused by the defect in the following signal of FIG. 26(*c*).

The output signal of the delaying circuit 132 of FIG. 26(*b*) and the signal of the light receiving element 31*d* of FIG. 26(*c*) are output to the dividing circuit 134. The dividing circuit 134 divides the following signal by the preceding delayed signal as previously mentioned. In other words, the signal of FIG. 26(*c*) is divided by the signal of FIG. 26(*b*); the resulting signal shown in FIG. 26(*d*) is output. The following signal contains the modulation component of the information pit; dividing the following signal by the preceding signal of the fixed level yields the signal composed only of the modulation component of the information pit as shown in FIG. 26(*d*). The quantities of light of the two verifying light spots are the same; therefore, the following and preceding signals reach the same level at the level drop due to the defect, so that the division of them results in the fixed (flat) signal level at the point of the defect. This means that the level drop of the verifying signal due to the defect on the optical card can be corrected and the extraction of only the modulation component attributable to the information pit is possible.

The signal resulting from the division performed by the dividing circuit 134 is output as the verifying signal to the MPU 62. The MPU 62 converts the verifying signal to a binary signal and compares the obtained binary signal with the recording signal to perform verifying while recording at the same time. When the scanning direction of the light spots is L, the selector switch SW1 is connected to L under the control of the MPU 62, so that the output signal of the dividing circuit 133 is selected as the verifying signal. In this case also, the dividing circuit 133 divides the following signal of the light receiving element 31*b* by the signal which has been delayed by the predetermined time by the delaying circuit 131 and outputs a verifying signal, the level drop of which due to the defect of the optical card has been corrected. The MPU 62 converts the verifying signal to a binary signal and compares the binary signal with the recording signal to perform verifying.

Figure 27:
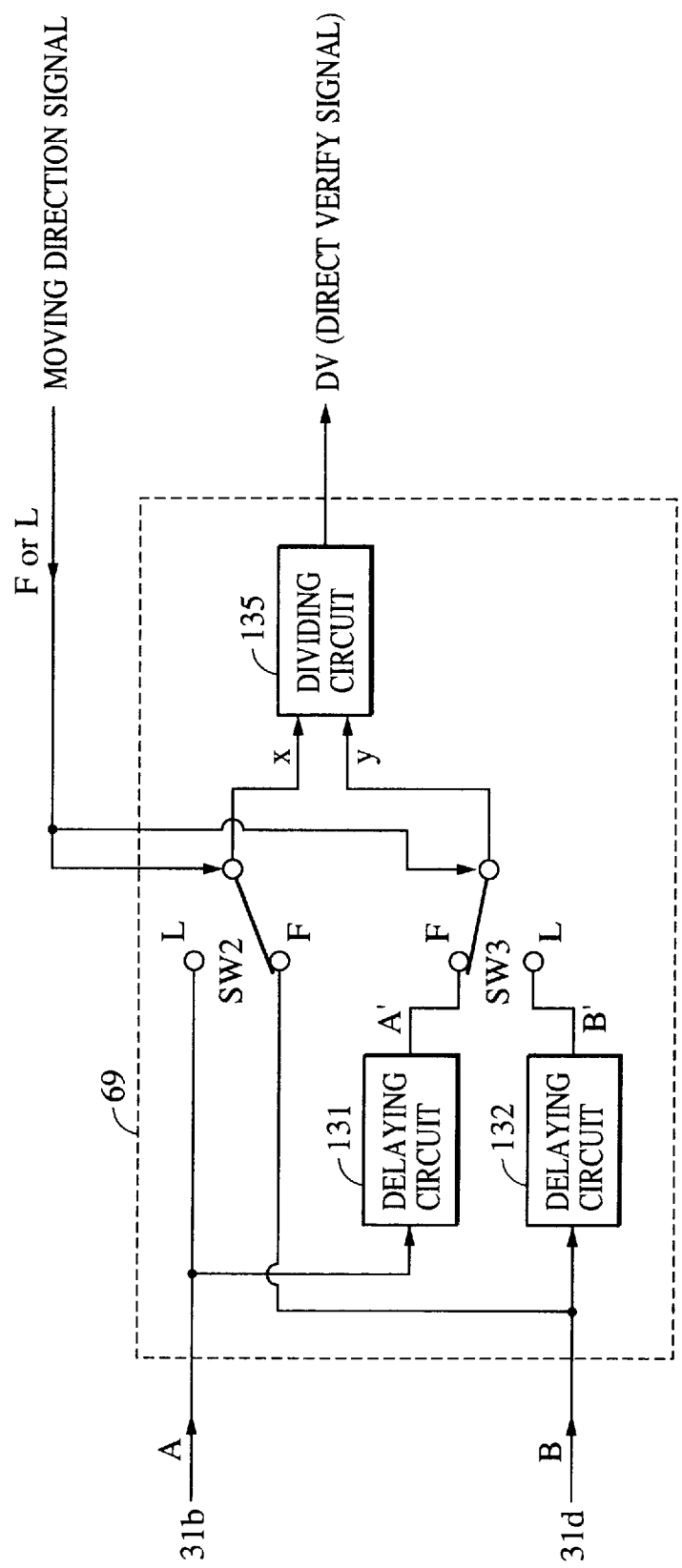
FIG. 27 is a block diagram showing another example of the delaying/dividing circuit.

FIG. 27 is the circuit diagram showing another embodiment of the delaying/dividing circuit 69. The delaying/dividing circuit 69 shown in FIG. 27 includes two delaying circuits 131 and 132, two selector switches SW2 and SW3, and a single dividing circuit 135. The connection of the selector switches SW2 and SW3 is changed according to the scanning direction of the light spots. Further, in FIG. 27, the signal of the verifying light receiving element 31*b* is denoted as A and the signal of 31*d* is denoted as B; these signals are the signals obtained after the gain is changed.

To be more specific, when the scanning direction of the light spots is F, the selector switches SW2 and SW3 are both connected to F, so that signal B of the light receiving element 31*d* is applied to terminal x of the dividing circuit 135, and signal A' from the light receiving element 31*b* via the delaying circuit 131 is applied to terminal y of the dividing circuit 135. When the light spots are run in the direction F, the signal of the light receiving element 31*d* is the following signal; therefore, signal A of the light receiving element 31*b* is delayed by a predetermined time T through the delaying circuit 131 as in the case shown in FIG. 25. The dividing circuit 135 divides the input signal at terminal x by the input signal at terminal y. The signal (B/A'), which is obtained by dividing following signal B of the light receiving element 31*d* by output signal A' of the delaying circuit 131 resulting from delaying the preceding signal, is output as the verifying signal.

If the scanning direction of the light spots is L, then the selector switches SW2 and SW3 are connected to L, so that signal A of the light receiving element 31*b* is applied to terminal x of the dividing circuit 135, and signal B' from the light receiving element 31*d* via the delaying circuit 132 is applied to terminal y of the dividing circuit 135. When the light spots run in the direction L, signal B of the light receiving element 31*d* is the preceding signal; therefore, the signal of the light receiving element 31*d* is delayed by a predetermined time T through the delaying circuit 132. As previously described, the dividing circuit 135 divides the input signal at terminal x by the input signal at terminal y. Thus, signal (A/B'), which is obtained by dividing following signal A of the light receiving element 31*d* by preceding delayed signal B' of the delaying circuit 132, is output as the verifying signal to the MPU 62.

Thus, the connection of the two selector switches SW2 and SW3 is changed according to the scanning direction of the light spots and the signals supplied to input terminals x and y of the dividing circuit 135 are switched between the preceding signal and the following signal, thereby making it possible to obtain the signal resulting from always dividing the following signal by the preceding delayed signal regardless of the scanning direction of the light spots just like the case shown in FIG. 25. Normally, the dividing circuits are more expensive than the selector switches. Since this embodiment requires only one dividing circuit although it requires two selector switches, it can be fabricated at lower cost than the apparatus shown in FIG. 25.

Figure 28:
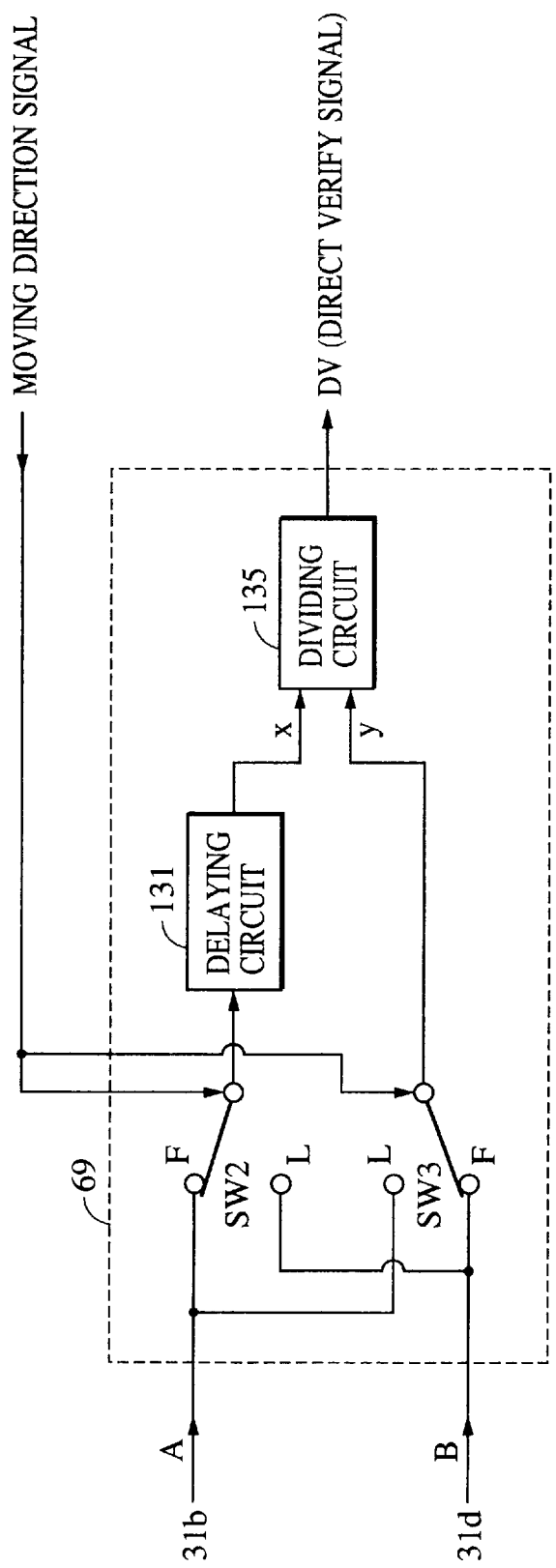
FIG. 28 is a block diagram showing still another example of the delaying/dividing circuit.

FIG. 28 is the circuit diagram showing still another example of the delaying/dividing circuit 69. The example shown in FIG. 28 has been improved over the circuit shown in FIG. 27 so that it requires only one delaying circuit. More specifically, when the scanning direction of the light spots is F, the selector switches SW2 and SW3 are connected to F. At this time, signal A of the light receiving element 31b is the preceding signal and signal B of the light receiving element 31d is the following signal; therefore, the preceding signal of the light receiving element 31b is delayed by a predetermined time T by the delaying circuit 131 as in the case of the FIG. 25 before it is applied to terminal x of the dividing circuit 135; the following signal of the light receiving element 31d is applied directly to terminal y of the dividing circuit 135. The dividing circuit 135 divides the input signal at terminal x by the input signal at terminal y as in the case of FIG. 27 and supplies the result as the verifying signal to the MPU 62.

When the scanning direction of the light spots is L, the selector switches SW2 and SW3 are connected to L, so that signal B of the light receiving element 31d is delayed for the predetermined time through the delaying circuit 131 and applied to terminal x of the dividing circuit 135; signal A of the light receiving element 31b is applied to terminal y of the dividing circuit 135. In this case, the signal of the light receiving element 31d is the preceding signal and the signal of the light receiving element 31b is the following signal. The dividing circuit 135 divides the input signal at terminal x by the input signal at terminal y and sends the result as the verifying signal to the MPU 62.

This embodiment also makes it possible to use the signal, which is obtained by dividing the following signal by the preceding delayed signal, as the verifying signal regardless of the scanning direction of the light spots just like the case illustrated in FIG. 25 and FIG. 27. This embodiment requires only one delaying circuit, so that it can be fabricated at lower cost than the apparatus shown in FIG. 27.

In the embodiments described above, the delaying/dividing circuit 69 divides the following verifying signal by the preceding verifying signal; however, it may alternatively divide the preceding signal by the following signal. In this case, however, the verifying signal resulting from the division does not show on the low level side with respect to the flat level, whereas it shows on the high level side with respect to the flat level. For this reason, the slicing level for converting the verifying signal to a binary signal should be set accordingly. Further, in this embodiment, the signal component attributable to the defect of the optical card is removed from the verifying signal. It is obvious that the present invention also allows other adverse influences of irregular reflection of an optical card, scratches or dust on the surface of the optical card, or other causes to be removed from the verifying signal.

Figure 29:
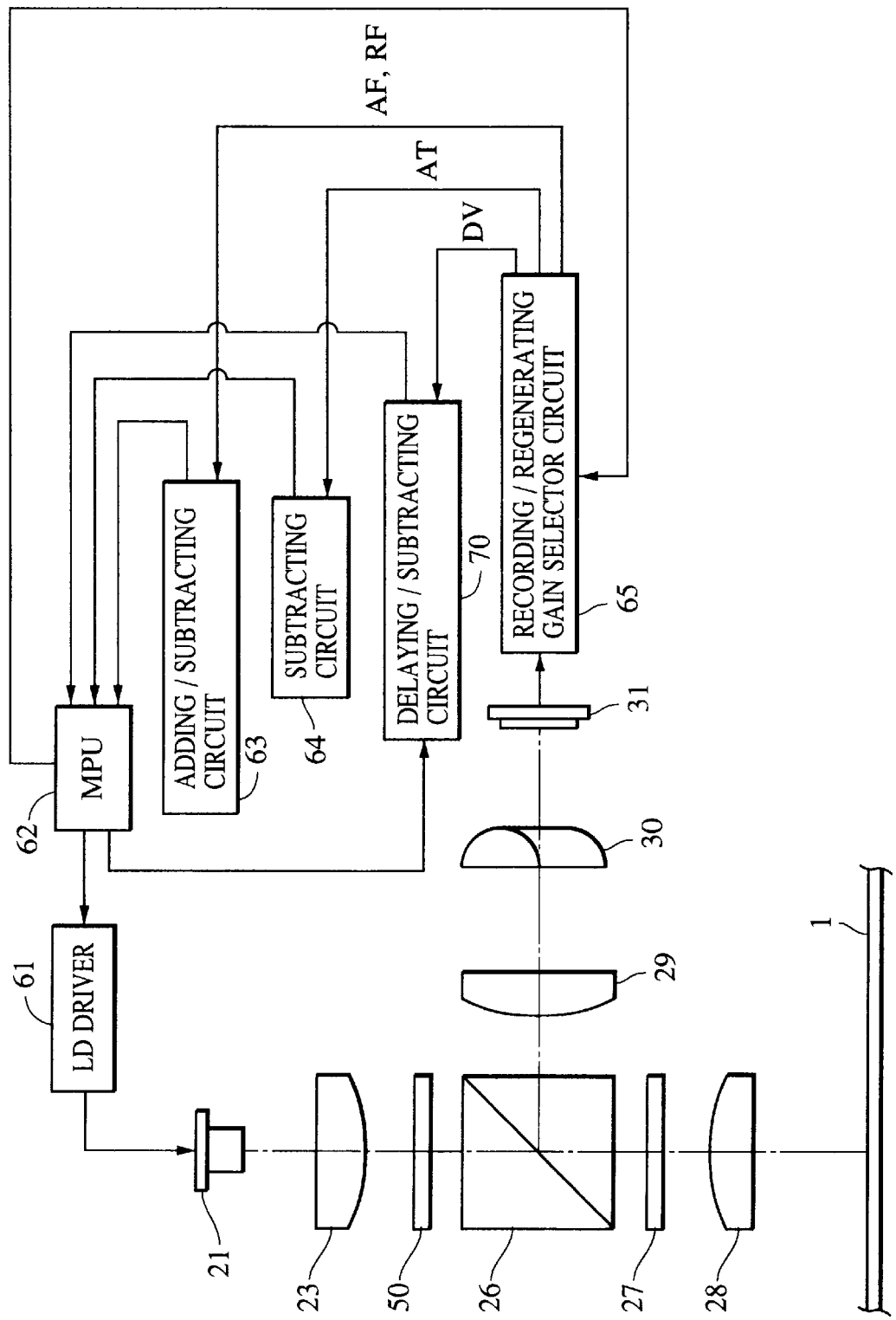
FIG. 29 is a diagram showing the configuration of another mode of the fourth embodiment.

FIG. 29 shows the configuration of another mode of the fourth embodiment. In FIG. 29, the same components as those of the FIG. 23 embodiment are assigned the same reference numerals and the description thereof will be omitted. This embodiment is provided with a delaying/subtracting circuit 70 in place of the delaying/dividing circuit 69 of the embodiment shown in FIG. 23. Specifically, two verifying signals among the output signals of the recording/reproducing gain selector circuit 65 are supplied to the delaying/subtracting circuit 70 and the signal component attributable to a defect of the optical card 1 is removed from the verifying signal as it will be discussed in detail later. The rest of the configuration is exactly identical to that shown in FIG. 23.

Figure 30:
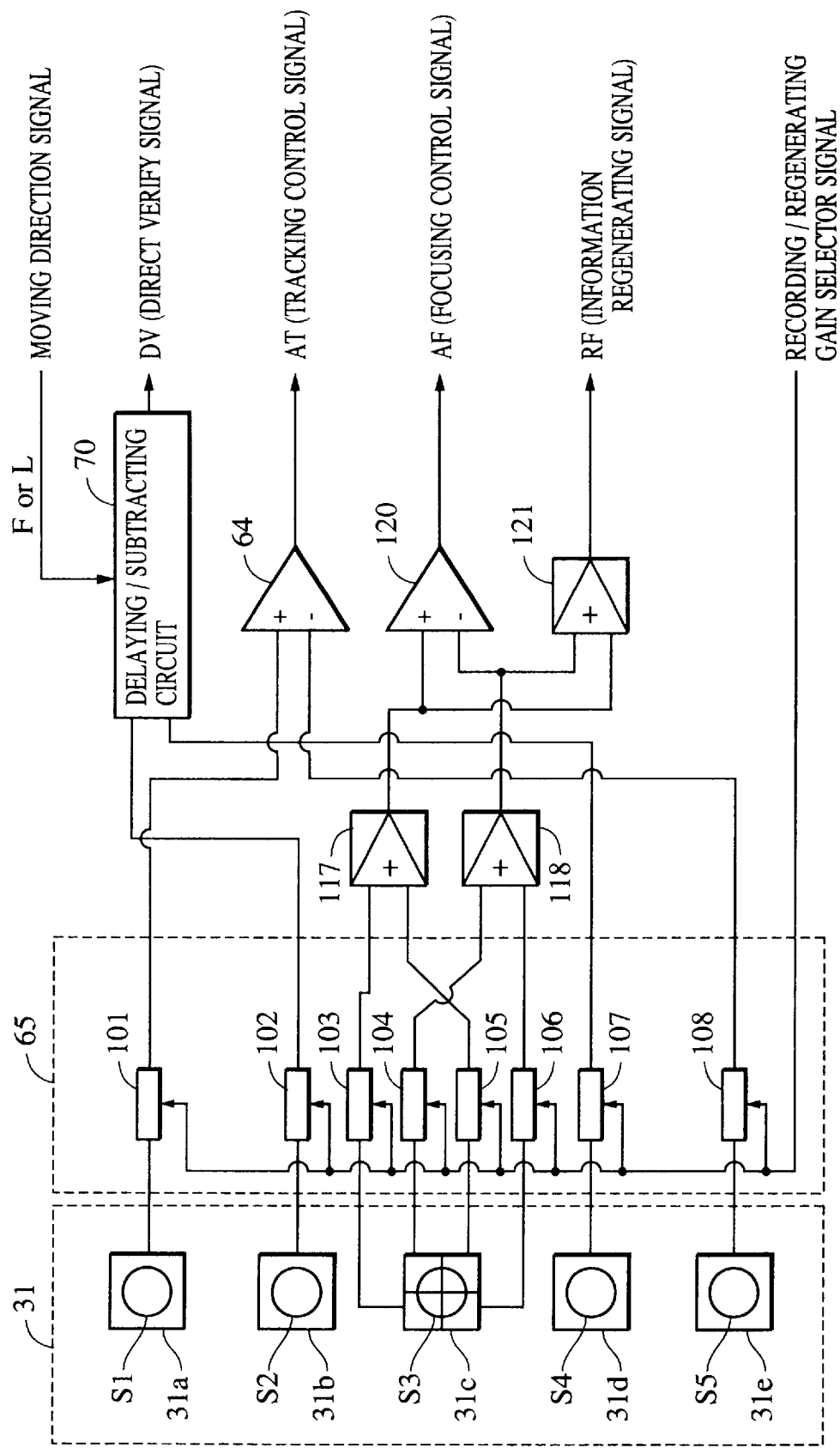
FIG. 30 is a circuit diagram showing the details of the signal processing circuit of the embodiment shown in FIG. 29.
Figure 31:
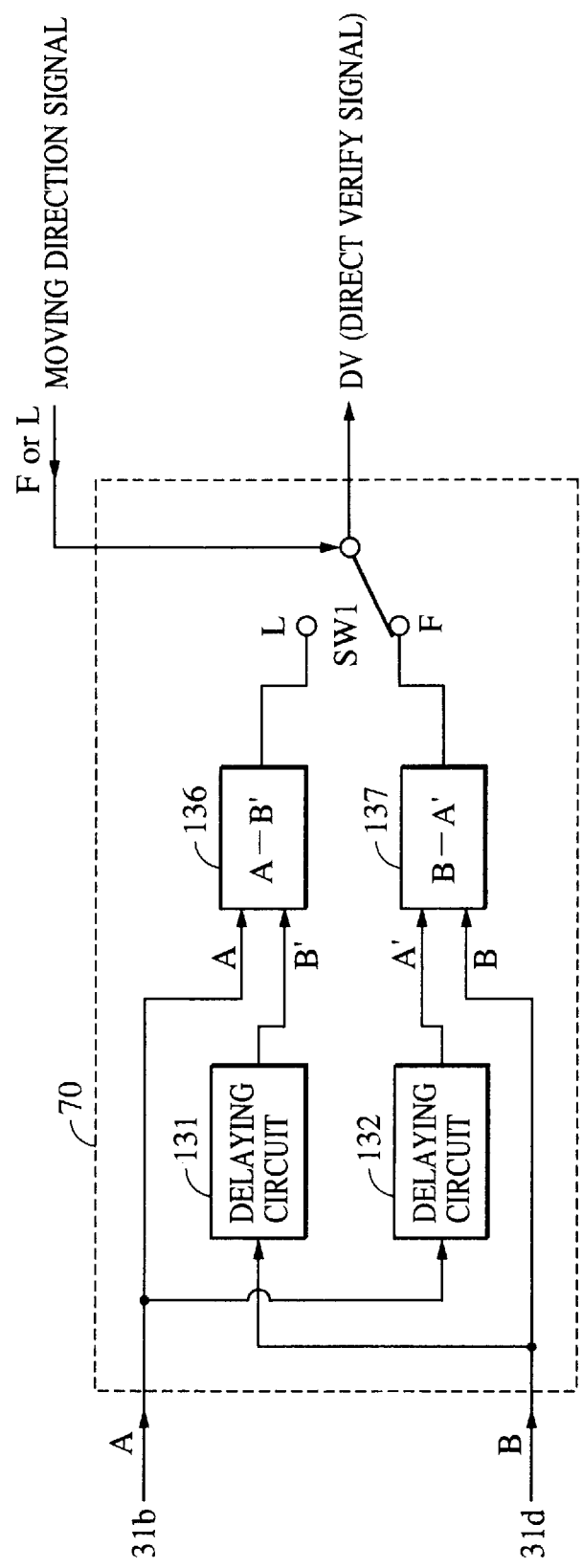
FIG. 31 is a block diagram showing an example of a delaying/subtracting circuit 70 of the embodiment shown in FIG. 29.

FIG. 30 is the circuit diagram showing the signal processing circuit of this embodiment. The same components as those of the signal processing circuit shown in the FIG. 24 of the previous embodiment are assigned the same reference numerals. The signal processing circuit shown in FIG. 30 is also provided with the delaying/subtracting circuit 70 in place of the delaying/dividing circuit 69. This delaying/subtracting circuit 70 generates the verifying signal and sends it to the MPU 62. The rest of the configuration is exactly the same as that shown in FIG. 24. The subtracting circuit 64 generates the AT control signal; the subtracting circuit 120 generates the AF control signal; and the adding circuit 121 generates the information reproducing signal. The output signals of the five light receiving elements of the optical detector 31 undergo the gain change through the respective corresponding gain selector circuits 101 through 108 of the recording/reproducing gain selector circuit 65; they become the signals from which the power modulation components have been removed and which have fixed levels. FIG. 31 is the circuit diagram showing the specific example of the delaying/subtracting circuit 70. In FIG. 31, reference numerals 131 and 132 denote delaying circuits; 136 and 137 denote subtracting circuits; and SW1 denotes a selector switch. Further, in FIG. 31, the verifying signal of the light receiving element 31b is indicated by A and the verifying signal of the light receiving element 31d is indicated by B. These signals A and B are the signals, the power modulation components of which have been corrected by the corresponding gain selector circuits of the recording/reproducing gain selector circuit 65. Verifying signal A of the light receiving element 31b is delayed by a predetermined time T by the delaying circuit 132. The subtracting circuit 137 subtracts delayed signal A' from verifying signal B of the light receiving element 31d to obtain the value of (B—A').

Verifying signal B of the light receiving element 31d is delayed by a predetermined time T by the delaying circuit 131. The subtracting circuit 136 subtracts delayed signal B' from signal A of the light receiving element 31b to output the value of (A–B'). Time delay T of the delaying circuits 131 and 132 is set as shown below as in the previous embodiment:

T=d/v where d denotes the interval between the two verifying light spots S2 and S4 shown in FIG. 2; and v denotes the relative moving velocity of the optical card and the light spots.

The output signals of the subtracting circuits 136 and 137 are supplied to the selector switch SW1 which selects one of the signals according to the moving direction signal which indicates the scanning direction of the light spots and which is issued by the MPU 62. For selecting one of the signals, the signal produced by delaying the verifying signal which precedes the recording light spot is subtracted from the verifying signal which follows the recording light. To be more specific, when the scanning direction of the light spots is F as shown in FIG. 2, the selector switch SW1 is connected to F to select the output signal of the subtracting circuit 137. In other words, while the scanning direction of the light spots is F, the verifying light spot S2 precedes the recording light spot S3 and the verifying light spot S4 follows the recording light spot S3; therefore, the output signal of the subtracting circuit 137 is selected and the signal obtained by subtracting the delayed preceding verifying signal from the following verifying signal is used for verifying.

When the scanning direction of the light spots is L as shown in FIG. 2, the selector switch SW1 is connected to L to select the output signal of the subtracting circuit 136. In other words, since the verifying light spot S4 precedes the recording light spot S3 and the verifying light spot S2 follows the recording light spot S3, the output signal of the subtracting circuit 136 is selected and the signal obtained by subtracting the delayed preceding verifying signal from the following verifying signal is output. Thus, the output signal of either the subtracting circuit 136 or 137 is selected by the selector switch SW1 according to the scanning direction of the light spots and supplied as the DV signal to the MPU 62.

Figure 32A:
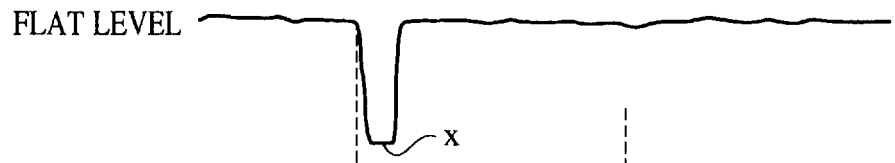
FIGS. 32(*a*) through 32(*d*) are diagrams showing the signals of the respective sections of the delaying/subtracting circuit shown in FIG. 31.

The specific operation of the embodiment will now be described in conjunction with FIGS. 32(a) through 32(d). It is assumed that, as shown in FIG. 2, the five light spots S1 through S5 are run on the information tracks of the optical card 1 to record information while verifying it at the same time and the defect mentioned above is present on the information tracks. It is also assumed that the scanning direction of the light spots is F and the selector switch SW1 of FIG. 31 is connected to F. FIG. 32(a) shows the signal which has been reproduced by the verifying light spot S2 which precedes the recording light spot S3 when the light spots are run in the direction F, that is, the signal from the verifying light receiving element 31b of the optical detector 31. The signal has, of course, undergone the gain change by the gain selector circuit 102.

Figure 32B:
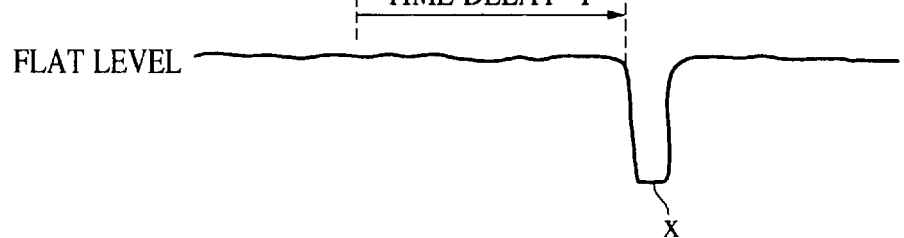

The signal which precedes the recording light spot exhibits almost a fixed level as shown in FIG. 32(a) because the verifying light spot runs on the unrecorded information tracks and therefore no modulation component due to the information pit is detected. This signal level is normally called the flat level. FIG. 32(a) indicates, however, the influence exerted by the defect on the information tracks in terms of a drop X in the signal level. The preceding signal of the light receiving element 31b is output to the delaying circuit 132 of FIG. 31 and delayed by a predetermined time T as stated above. FIG. 32(b) shows the delayed signal.

Figure 32C:
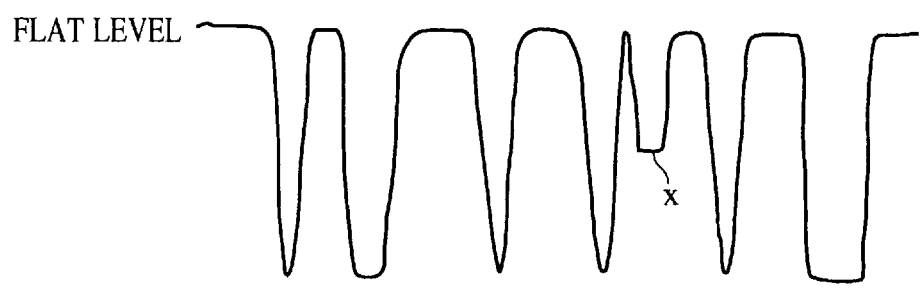

FIG. 32(c) shows the signal which has been reproduced by the verifying light spot S4 which comes after the recording light spot S3, that is, the signal from the verifying light receiving element 31d. This signal has, of course, undergone the gain change by the gain selector circuit 107. The signal contains the modulation component attributable to the information pit as shown in FIG. 32(c) because the verifying light spot S4 runs over the information pit immediately after recording. In this case also, since the light spot S4 runs over the defect, the influence of the defect is displayed as a drop X in the signal level. Furthermore, as illustrated in FIG. 32(b), since the preceding signal is delayed by time T, the timing of drop X in the level thereof coincides with the timing of drop X in the level caused by the defect in the following signal of FIG. 32(c).

Figure 32D:
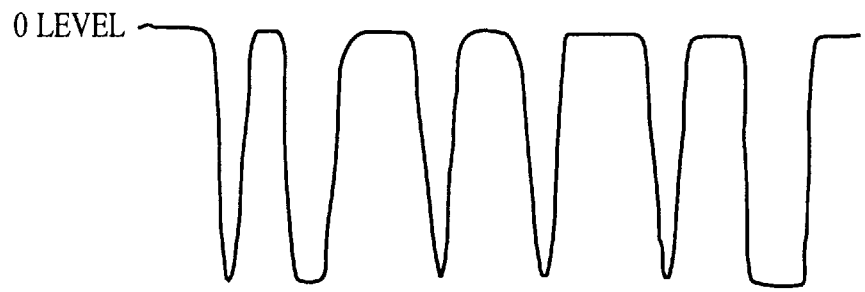

The output signal of the delaying circuit 132 of FIG. 32(b) and the signal of the light receiving element 31d of FIG. 32(c) are output to the subtracting circuit 137. The subtracting circuit 137 subtracts the preceding delayed signal from the following signal as previously mentioned. In other words, the signal of FIG. 32(b) is subtracted from the signal of FIG. 32(c); the resulting signal shown in FIG. 32(d) is output. The following signal contains the modulation component of the information pit; subtracting the preceding signal of the fixed level from the following signal yields the signal composed only of the modulation component of the information pit as shown in FIG. 32(d). In this case, however, the signal appears on the negative side with respect to the zero level as illustrated in FIG. 32(d). The quantities of light of the two verifying light spots are the same; therefore, the following and preceding signals of the light receiving elements which detect the reflected light reach the same level at the level drop due to the defect, so that the subtraction of them results in the zero signal level at the point of the defect as shown in FIG. 32(d). This means that, in this embodiment also, the level drop of the verifying signal due to the defect on the optical card can be corrected and the extraction of only the modulation component attributable to the information pit is possible.

The signal resulting from the subtraction performed by the subtracting circuit 137 is output as the verifying signal to the MPU 62. The MPU 62 converts the verifying signal to a binary signal and compares the obtained binary signal with the recording signal to perform verifying while recording at the same time. When the scanning direction of the light spots is L, the selector switch SW1 is connected to L under the control of the MPU 62, so that the output signal of the subtracting circuit 136 is selected as the verifying signal. In this case also, the subtracting circuit 136 subtracts the preceding signal, which has been delayed by the predetermined time by the delaying circuit 131, from the following signal of the light receiving element 31b and outputs a verifying signal, the level drop of which due to the defect of the optical card has been corrected. The MPU 62 converts the verifying signal to a binary signal and compares the binary signal with the recording signal to perform verifying while recording at the same time.

Figure 33:
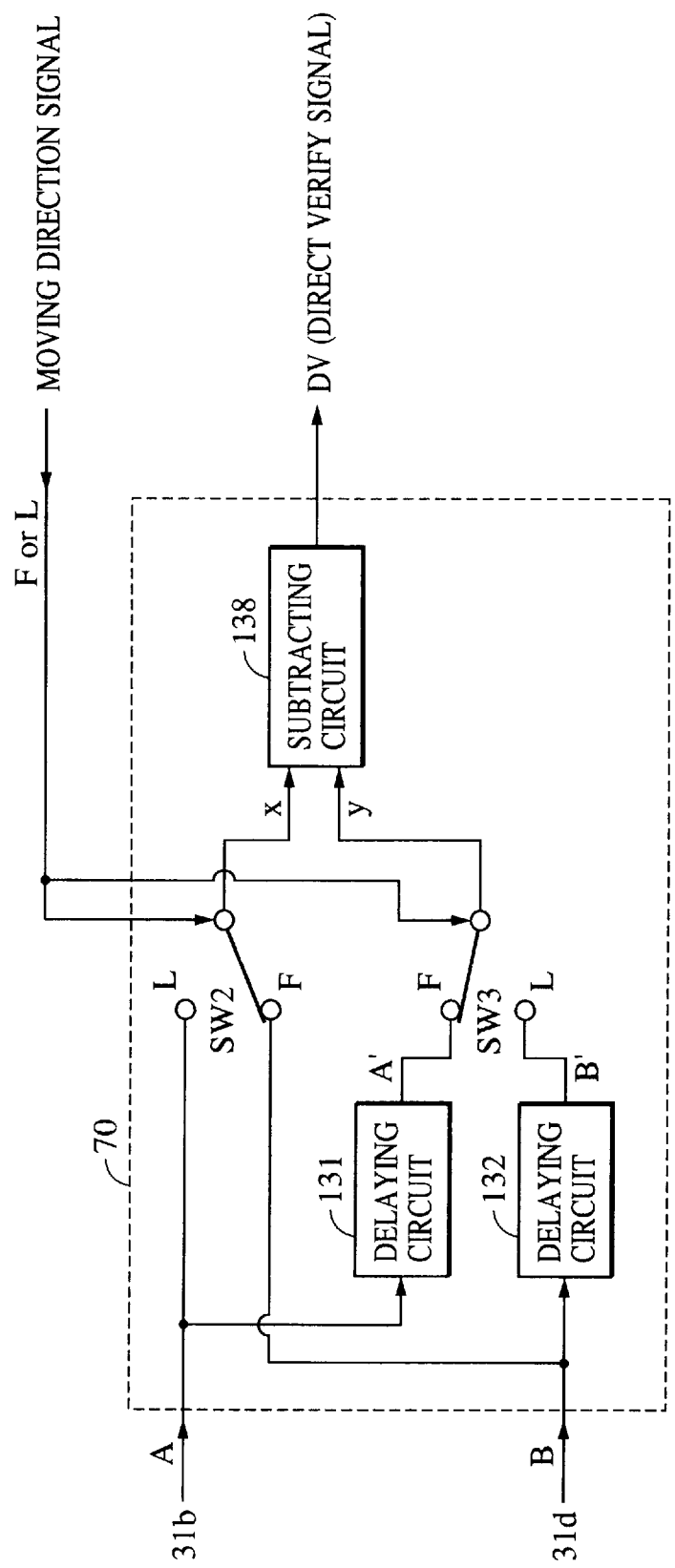
FIG. 33 is a block diagram showing another example of the delaying/subtracting circuit.

FIG. 33 is the circuit diagram showing another example of the delaying/subtracting circuit 70. The circuit 70 shown in FIG. 33 includes two delaying circuits 131 and 132, two selector switches SW2 and SW3, and a single subtracting circuit 138. The connection of the selector switches SW2 and SW3 is changed according to the scanning direction of the light spots. Further, in FIG. 33, the signal of the verifying light receiving element 31b is denoted as A and the signal of 31d is denoted as B; these signals are the signals obtained after the gain is changed.

To be more specific, when the scanning direction of the light spots is F, the selector switches SW2 and SW3 are both connected to F, so that signal B of the light receiving element 31d is applied to terminal x of the subtracting circuit 138, and signal A' from the light receiving element 31b via the delaying circuit 131 is applied to terminal y of the subtracting circuit 138. When the light spots are run in the direction F, the signal of the light receiving element 31b is the preceding signal and the signal of the light receiving element 31d is the following signal; therefore, signal A of the light receiving element 31b is delayed by a predetermined time T through the delaying circuit 131 as in the case shown in FIG. 31. The subtracting circuit 138 subtracts the input signal at terminal y from the input signal at terminal x. The signal (B—A'), which is obtained by subtracting output signal A' of the delaying circuit 131 resulting from delaying the preceding signal from following signal B of the light receiving element 31d, is output as the verifying signal.

If the scanning direction of the light spots is L, then the selector switches SW2 and SW3 are connected to L, so that signal A of the light receiving element 31b is applied to terminal x of the subtracting circuit 138, and signal B' from the light receiving element 31d via the delaying circuit 132 is applied to terminal y of the subtracting circuit 138. When the light spots run in the direction L, signal B of the light receiving element 31d is the preceding signal; therefore, the signal of the light receiving element 31*d* is delayed by a predetermined time T through the delaying circuit 132. The subtracting circuit 138 subtracts the input signal at terminal y from the input signal at terminal x. Thus, signal (A–B'), which is obtained by subtracting preceding delayed signal B' of the delaying circuit 132 from following signal A of the light receiving element 31*b*, is output as the verifying signal to the MPU 62.

Thus, the connection of the two selector switches SW2 and SW3 is changed according to the scanning direction of the light spots and the signals supplied to input terminals x and y of the subtracting circuit 138 are switched between the preceding signal and the following signal, thereby making it possible to obtain the signal resulting from always subtracting the preceding delayed signal from the following signal regardless of the scanning direction of the light spots just like the case shown in FIG. 31. Normally, the subtracting circuits are more expensive than the selector switches. Since this embodiment requires only one subtracting circuit although it requires two selector switches, it can be fabricated at lower cost than the apparatus shown in FIG. 31.

Figure 34:
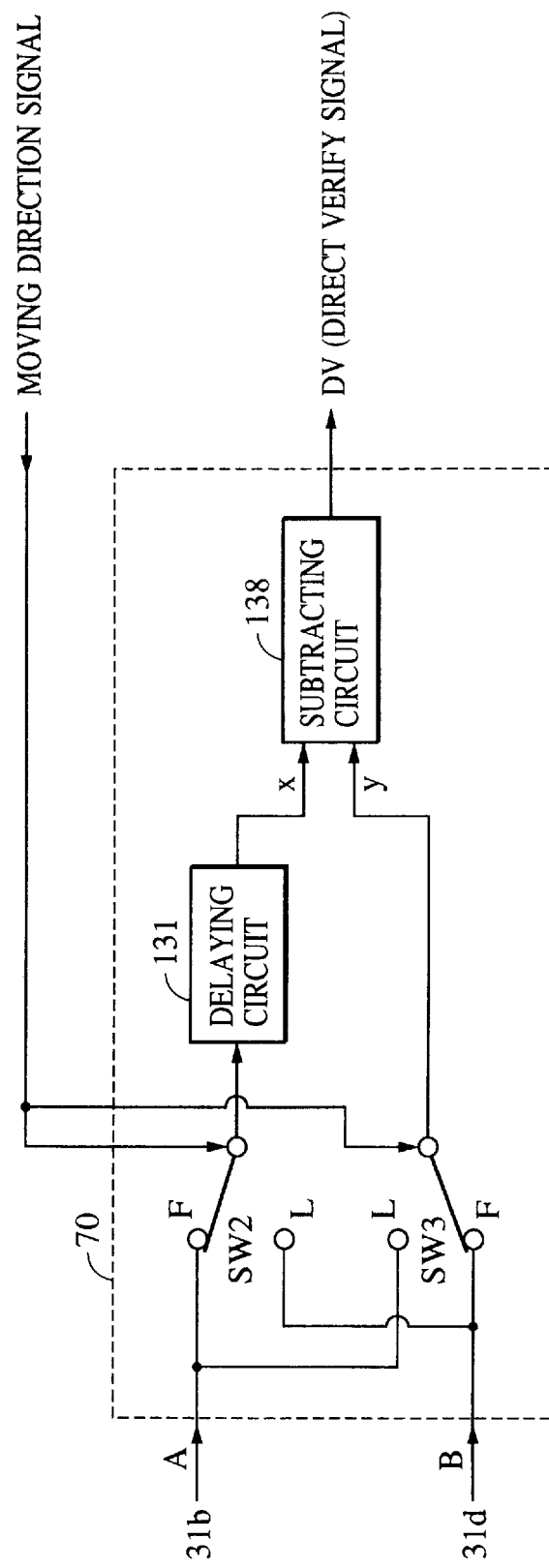
FIG. 34 is a block diagram showing still another example of the delaying/subtracting circuit.

FIG. 34 is the circuit diagram showing still another example of the delaying/subtracting circuit 70. The example shown in FIG. 34 has been improved over the circuit shown in FIG. 33 so that it requires only one delaying circuit. More specifically, when the scanning direction of the light spots is F, the selector switches SW2 and SW3 are connected to F. At this time, signal A of the light receiving element 31*b* is the preceding signal and signal B of the light receiving element 31*d* is the following signal; therefore, the preceding signal of the light receiving element 31*b* is delayed by a predetermined time T by the delaying circuit 131 as in the case of FIG. 31 before it is applied to terminal x of the subtracting circuit 138; the following signal of the light receiving element 31*d* is applied directly to terminal y of the subtracting circuit 138. The subtracting circuit 138 subtracts the input signal at terminal y from the input signal at terminal x as in the case of FIG. 33 and supplies the result as the verifying signal to the MPU 62.

When the scanning direction of the light spots is L, the selector switches SW2 and SW3 are connected to L, so that signal B of the light receiving element 31*d* is delayed for the predetermined time through the delaying circuit 131 and applied to terminal x of the subtracting circuit 138; signal A of the light receiving element 31*b* is applied to terminal y of the subtracting circuit 138. In this case, the signal of the light receiving element 31*d* is the preceding signal and the signal of the light receiving element 31*b* is the following signal. The subtracting circuit 138 subtracts the input signal at terminal y from the input signal at terminal x and sends the result as the verifying signal to the MPU 62.

This embodiment also makes it possible to use the signal, which is obtained by subtracting the preceding delayed signal from the following signal, as the verifying signal regardless of the scanning direction of the light spots just like the case illustrated in FIG. 31 and FIG. 33. This embodiment requires only one delaying circuit, so that it can be fabricated at lower cost than the apparatus shown in FIG. 33.

In the embodiments described above, the delaying/subtracting circuit 70 subtracts the preceding delayed verifying signal from the following verifying signal; however, the relation of the subtraction may be reversed. In this case, however, the verifying signal obtained by subtracting the following signal from the preceding signal does not appear on the negative side with respect to the zero level as shown in FIG. 32(*d*); it appears on the positive side with respect to the zero level. For this reason, the slicing level for converting the verifying signal to a binary signal should be set accordingly. Further, in this embodiment also, the level fluctuation in the verifying signal due to the defect in the optical card is corrected; it is obvious that other adverse influences of irregular reflection, scratches or dust on the surface of the optical card, or other causes can also be removed from the verifying signal.

In this embodiments shown in FIG. 23 and FIG. 29, the delaying/dividing circuit 67 and the delaying/subtracting circuit 70 may be operated at all times whether the apparatus is recording or reproducing; however, it is desirable to suspend the operation of the circuits during an operation other than the recording operation which involves verifying. This is because, if the circuits are operated during non-recording operations, then the verifying signals are issued to the MPU and the MPU accordingly has to perform wasteful processing, resulting in time loss in information processing at the time of reproduction. Thus, the circuits should be operated only during recording.

Moreover, the embodiments shown in FIG. 23 and FIG. 29 refer to the examples of the apparatuses employing the optical cards as the recording media. The present invention, however, is not limited thereto; it can be applied also to other apparatuses which employ optical disks, magneto-optical disks, or the like. In such a case, the direction of rotation of the disk recording medium is usually fixed and the scanning direction of the light spots is fixed; therefore, no circuit for switching between the dividing circuits or the subtracting circuits by the selector switches is required. This is true with a case wherein the light spots are run only in one direction to record information on an optical card. In such a case, the following signal may be divided or subtracted by the preceding signal or vice versa.

What is claimed is:

1. An optical information recording and reproducing apparatus which records information by scanning an information track of an information recording medium with a recording light spot modulated in accordance with an information signal and which performs scanning of a verifying light spot after said recording light spot to reproduce the recorded information by said verifying light spot so as to generate a verifying signal, said apparatus comprising:

a gain selector circuit for changing the gain of said verifying signal as an input signal by changing a plurality of predetermined gains according to the modulation of said recording light spot, wherein an output signal of said gain selector circuit is employed to verify the information which has been recorded by said recording light spot.

2. An optical information recording and reproducing apparatus according to claim 1, wherein said recording light spot and said verifying light spot are formed by dividing a single laser beam emitted from a single laser light source.

3. An optical information recording and reproducing apparatus according to claim 1, wherein said verifying light spot is one of two verifying light sports disposed before and after said recording light spot in the running direction of said recording light spot.

4. An optical information recording and reproducing apparatus according to claim 3, wherein said verifying signal is generated based on the reflected light of one of said verifying light spots which is selected according to the running direction of said recording light spot.

5. An optical information recording and reproducing apparatus according to claim 3, wherein said gain selector circuit changes the gains of two signals, which are generated based on the reflected light of said two verifying light spots, according to the modulation of said recording light spot.

6. An optical information recording and reproducing apparatus according to claim 5, wherein one of said two signals, the gains of which have been changed, is divided by the other signal.

7. An optical information recording and reproducing apparatus according to claim 5, wherein one of said two signals, the gains of which have been changed, is subtracted from the other signal.

8. An optical information recording and reproducing apparatus according to claim 6 or 7, wherein a signal which becomes a minuend or dividend in said division or subtraction is the signal which is generated based on the reflected light of the verifying light spot which comes after said recording light spot in said running direction.

9. An optical information recording and reproducing apparatus according to claim 5, wherein one of said two signals, the gains of which have been changed, is delayed and the other signal is divided by said delayed signal.

10. An optical information recording and reproducing apparatus according to claim 5, wherein one of said two signals, the gains of which have been changed, is delayed and said delayed signal is subtracted from the other signal.

11. An optical information recording and reproducing apparatus according to claim 9 or 10, wherein said signal to be delayed is the signal which is generated based on the reflected light of a verifying light spot which comes before said recording light spot in said running direction.

12. An optical information recording and reproducing method wherein information is recorded by running a recording light spot, which has been modulated in accordance with an information signal, on an information track of an information recording medium and a verifying light spot is run after the recording light spot to reproduce the recorded information by the verifying light spot so as to generate a verifying signal, said method comprising:

a step for changing the gain of the verifying signal by a gain selector circuit by changing a plurality of predetermined gains according to the modulation of the recording light spot; and a step for verifying the information, which has been recorded by the recording light spot, by using an output signal of the gain selector circuit.

* * * * *

UNITED STATES PATENT AND TRADEMARK OFFICE
CERTIFICATE OF CORRECTION

PATENT NO. : 5,808,991

DATED : September 15, 1998

INVENTOR : MASATO INOUE

Page 1 of 2

It is certified that error appears in the above-identified patent and that said Letters Patent is hereby corrected as shown below:

<u>ON THE COVER PAGE</u>

<u>Under item [30] "Foreign Application Priority Data"</u>,
"Mar. 6, 1995 [JP] Japan....7-057383" should read
--Mar. 16, 1995 [JP] Japan....7-057383--.

<u>COLUMN 5</u>,
Line 9, "5(e)" should read --5(e).--.

<u>COLUMN 12</u>,
Line 38, "of light" should read --of a light--; and
Line 39, "a" should be deleted.

<u>COLUMN 22</u>,
Line 23, "(B÷A'). Verifying" should read --(B÷A'). ¶ Verifying--.

<u>COLUMN 23</u>,
Line 5, "FIG. 26." should read --FIG. 26(a) through FIG. 26(d).--.

UNITED STATES PATENT AND TRADEMARK OFFICE
CERTIFICATE OF CORRECTION

PATENT NO. : 5,808,991

DATED : September 15, 1998

INVENTOR : MASATO INOUE

Page 2 of 2

It is certified that error appears in the above-identified patent and that said Letters Patent is hereby corrected as shown below:

<u>COLUMN 26</u>,
Line 23, "levels. FIG. 31" should read --levels. ¶ FIG. 31--.

Signed and Sealed this

Twelfth Day of December, 2000

Attest:

Attesting Officer

Q. TODD DICKINSON

Director of Patents and Trademarks